(12) United States Patent
Anami et al.

(10) Patent No.: US 10,846,537 B2
(45) Date of Patent: Nov. 24, 2020

(54) INFORMATION PROCESSING DEVICE, DETERMINATION DEVICE, NOTIFICATION SYSTEM, INFORMATION TRANSMISSION METHOD, AND PROGRAM

(71) Applicant: NEC Corporation, Tokyo (JP)

(72) Inventors: Shinichi Anami, Tokyo (JP); Makoto Igarashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 141 days.

(21) Appl. No.: 15/761,180

(22) PCT Filed: Sep. 21, 2016

(86) PCT No.: PCT/JP2016/077859
§ 371 (c)(1),
(2) Date: Mar. 19, 2018

(87) PCT Pub. No.: WO2017/057135
PCT Pub. Date: Apr. 6, 2017

(65) Prior Publication Data
US 2018/0268224 A1 Sep. 20, 2018

(30) Foreign Application Priority Data

Sep. 30, 2015 (JP) .................. 2015-195218

(51) Int. Cl.
*G06N 20/00* (2019.01)
*G06K 9/00* (2006.01)
(Continued)

(52) U.S. Cl.
CPC ..... *G06K 9/00771* (2013.01); *G06K 9/00335* (2013.01); *G06K 9/2054* (2013.01);
(Continued)

(58) Field of Classification Search
CPC .... G06F 16/3329; G06F 16/285; G06F 16/35; H04L 9/3236; G06T 2207/20081;
(Continued)

(56) References Cited

U.S. PATENT DOCUMENTS 7,319,780 B2 * 1/2008 Fedorovskaya ....... G06F 19/321
128/922
7,379,568 B2 * 5/2008 Movellan ........... G06K 9/00248
382/118

(Continued)

FOREIGN PATENT DOCUMENTS

| JP | 2005-267594 A | 9/2005 |
| JP | 2006-148442 A | 6/2006 |

(Continued)

OTHER PUBLICATIONS

International Search Report for PCT Application No. PCT/JP2016/077859, dated Dec. 6, 2016.

*Primary Examiner* — Andrew M Moyer
*Assistant Examiner* — Dennis Rosario

(57) ABSTRACT

An information processing device includes: an information acquisition unit that acquires information on a target included in an image; and a transmission unit that determines a transmission destination of the image or information on the image according to the information on the target and transmits the image or the information on the image to the determined transmission destination.

7 Claims, 11 Drawing Sheets

(51) Int. Cl.
*G08B 25/04* (2006.01)
*G08B 25/00* (2006.01)
*H04N 7/18* (2006.01)
*G08B 13/196* (2006.01)
*G06K 9/20* (2006.01)
*G06K 9/62* (2006.01)
*G06K 9/66* (2006.01)

(52) U.S. Cl.
CPC ............ *G06K 9/6267* (2013.01); *G06K 9/66* (2013.01); *G06N 20/00* (2019.01); *G08B 13/19602* (2013.01); *G08B 13/19613* (2013.01); *G08B 25/00* (2013.01); *G08B 25/04* (2013.01); *H04N 7/18* (2013.01)

(58) Field of Classification Search
CPC .......... G06K 9/00771; G06K 9/00288; G06K 2009/00738; G06K 9/00228; G06K 9/00718; G06K 9/00335; G06K 9/00295; G06K 9/6223; G06K 9/6221; G06K 9/6218; G06K 9/6219; G06K 9/6222; G06N 20/00; G06N 3/08; G06N 7/005; G06N 3/04
See application file for complete search history.

(56) References Cited

U.S. PATENT DOCUMENTS

| | | | | |
|---|---|---|---|---|
| 8,401,282 | B2* | 3/2013 | Porikli | G06K 9/622 |
| | | | | 382/159 |
| 8,805,124 | B2* | 8/2014 | Cohen | G06F 16/5866 |
| | | | | 382/305 |
| 9,465,857 | B1* | 10/2016 | DeLand | G06F 16/285 |
| 9,762,865 | B2* | 9/2017 | Carey | G06T 7/246 |
| 10,019,657 | B2* | 7/2018 | Lin | G06K 9/6272 |
| 10,161,754 | B2* | 12/2018 | Matsushita | G01C 21/32 |
| 10,262,217 | B2* | 4/2019 | Cohen | G05D 1/0214 |
| 2009/0119336 | A1* | 5/2009 | Xu | G06Q 10/10 |
| 2011/0019928 | A1 | 1/2011 | Naito | |
| 2011/0170769 | A1 | 7/2011 | Sakimura et al. | |
| 2017/0330058 | A1* | 11/2017 | Silberman | G06Q 30/0201 |

FOREIGN PATENT DOCUMENTS

| | | |
|---|---|---|
| JP | 2008-052563 A | 3/2008 |
| JP | 2011-028586 A | 2/2011 |
| JP | 2011-145791 A | 7/2011 |
| JP | 2012-104022 A | 5/2012 |
| JP | 2012-128638 A | 7/2012 |
| JP | 2012-164008 A | 8/2012 |

* cited by examiner

INFORMATION PROCESSING DEVICE, DETERMINATION DEVICE, NOTIFICATION SYSTEM, INFORMATION TRANSMISSION METHOD, AND PROGRAM

This application is a National Stage Entry of PCT/JP2016/077859 filed on Sep. 21, 2016, which claims priority from Japanese Patent Application 2015-195218 filed on Sep. 30, 2015, the contents of all of which are incorporated herein by reference, in their entirety.

TECHNICAL FIELD

The present invention relates to an information processing device, a determination device, a notification system, an information transmission method, and a program

BACKGROUND ART

Patent Document 1 discloses a technology of displaying candidates for learning images for machine learning to allow a user to manually select images to be used as learning images.

CITATION LIST

Patent Document

[Patent Document 1]
Japanese Unexamined Patent Application, First Publication No. 2011-145791

SUMMARY OF INVENTION

Technical Problem

However, according to the technology disclosed in Patent Document 1, it is not possible to determine a transmission destination appropriate for an image. Specifically, although Patent Document 1 discloses a technology for selecting images to be used as learning images, a technology for determining a person who selects the images from a plurality of candidates is not disclosed.

The present invention provides a device, a method, and a program for solving the above-mentioned problem.

Solution to Problem

According to a first aspect of the present invention, an information processing device includes an information acquisition unit configured to acquire information on a target included in an image; and a transmission unit configured to determine a transmission destination of the image or information on the image according to the information on the target and transmit the image or the information on the image to the determined transmission destination.

According to a second aspect of the present invention, a determination device includes a display unit configured to acquire an image or information on the image from an information processing device and display the image or the information on the image, wherein the information processing device determines a transmission destination of the image or the information on the image according to information on a target included in the image and transmits the image or the information on the image; a determination unit configured to determine whether the image or the information on the image will be used for machine learning; and an output unit configured to output a result of the determination as learning data of the machine learning.

According to a third aspect of the present invention, a notification system includes a first information processing device having an output unit configured to output information on a target included in an image; and a second information processing device having a transmission unit configured to determine a transmission destination of the image or information on the image according to information on the target and transmits the image or the information on the image to the determined transmission destination.

According to a fourth aspect of the present invention, an information transmission method includes an information acquisition step of allowing an information processing device to acquire information on a target included in an image; and a transmission step of allowing the information processing device to determine a transmission destination of the image or information on the image according to the information on the target and transmit the image or the information on the image to the determined transmission destination.

According to a fifth aspect of the present invention, a program causes an information processing device to execute: an information acquisition step of acquiring information on a target included in an image; and a transmission step of determining a transmission destination of the image or information on the image according to the information on the target and transmitting the image or the information on the image to the determined transmission destination.

Advantageous Effects of Invention

According to this invention, it is possible to determine a transmission destination appropriate for an image.

DESCRIPTION OF EMBODIMENTS

Hereinafter, while some embodiments of the present invention will be described, the following embodiments do not limit the invention described in the claims. Moreover, all the combinations of the features described in the embodiments are not necessarily essential to the solving means of the invention.

Figure 1:
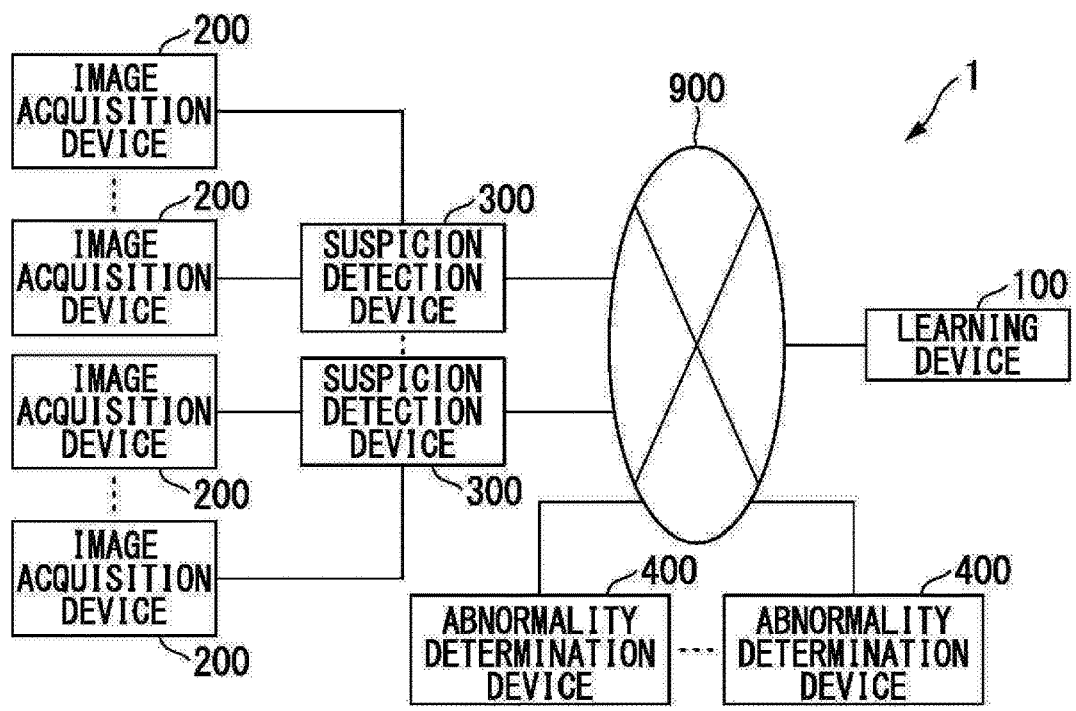
FIG. 1 is a diagram showing an example of a device configuration of a notification system according to an embodiment of the present invention.

FIG. 1 is a diagram showing an example of a device configuration of a notification system according to an embodiment of the present invention. As shown in the drawing, a notification system 1 includes a learning device 100, an image acquisition device 200, a suspicion detection device 300, and an abnormality determination device 400. The image acquisition device 200 and the suspicion detection device 300 are communicably connected. Moreover, the learning device 100, the suspicion detection device 300, and the abnormality determination device 400 are communicably connected via a network 900.

The notification system 1 determines a transmission destination (a notification destination) of an image or information on the image according to information on a target included in the image and transmits the image or the information on the image to the determined transmission destination. The target mentioned herein is a target of image recognition and may be a person, an object, or an organization.

Specifically, the notification system 1 captures images of the inside of a monitoring target store and detects the possibility of occurrence of abnormalities in the store such as fraudulent disbursements in a cash register or a point of sale (POS) system. Moreover, the notification system 1 selects a notification destination of the abnormality occurrence possibility according to the detected abnormality and notifies the selected notification destination of the abnormality occurrence possibility. For example, the notification system 1 notifies a person other than a person included in the image of the abnormality occurrence possibility according to the person included in the image. The person included in the image is a person photographed in the image.

The abnormality occurrence possibility will be also referred to as suspicion. However, the notification system 1 can be used in various uses without being limited to monitoring in stores as will be described later. Depending on the use of the notification system 1 such as cases in which the notification system 1 is used for detecting a fall of a person, finding a lost object, or finding a missing child, the abnormality occurrence possibility to be detected by the notification system 1 does not correspond to "suspicion" in the sense of feeling suspicious but means that there is a possibility that a present situation is different from a normal case.

In the following description, an image detected by the notification system 1 using a model will be also referred to as a suspicious image. However, as described above, when the abnormality occurrence possibility detected by the notification system 1 does not correspond to suspicion, the image detected by the notification system 1 using a model does not correspond to a "suspicious image" in the sense that a suspicious aspect is photographed in the image but is an image in which an aspect which is possibly different from a normal case is photographed.

The learning device 100 generates a model (a learning model) for detecting suspicion. The learning device 100 generates a model for calculating an evaluation value of an occurrence possibility of an abnormality correlated with a category for respective categories into which abnormalities are categorized.

Moreover, the learning device 100 may function as a notification destination determination device and determine a transmission destination of an image for which it is determined that the abnormality occurrence possibility is present or information on the image on the basis of the image. For example, the learning device 100 determines a person other than a person included in the image for which it is determined that the abnormality occurrence possibility is present as a notification destination of an abnormality occurrence possibility depending on the person included in the image for which it is determined that the abnormality occurrence possibility is present, and the learning device 100 notifies the person other than the person included in the image for which it is determined that the abnormality occurrence possibility is present. The learning device 100 corresponds to an example of an information processing device.

The learning device 100 may acquire a learning model from an external device of the notification system 1 without generating the learning model by the learning device 100 itself.

The learning device 100 may function as a reporting device and report the occurrence of an abnormality to a predetermined transmission destination upon receiving a report request from the abnormality determination device 400. For example, the abnormality determination device 400 may report the occurrence of an abnormality to the police as a predetermined transmission destination and may report the occurrence of an abnormality to a security company.

The learning device 100 is configured to include a computer, for example.

Moreover, the learning device 100 is configured as a cloud-side device. Specifically, the learning device 100 is configured as a device in the network 900 when seen by the user of the abnormality determination device 400. However, the learning device 100 may be configured as an edge-side device.

For example, the learning device 100 and the suspicion detection device 300 may be configured integrally and may be installed in a monitoring target store. Alternatively, the learning device 100 may be installed on the same local area network (LAN) as the suspicion detection device 300 installed in the monitoring target store. Alternatively, the learning device 100 and the suspicion detection device 300 may be configured integrally and installed on a cloud. Alternatively, the learning device 100 may be installed on the same local area network (LAN) as the suspicion detection device 300 installed on a cloud.

The image acquisition device 200 captures images of the inside of the monitoring target store and acquires the images of the inside of the store. The image acquisition device 200 may capture a moving image and may capture a still image.

The suspicion detection device 300 performs a suspicion detection process with respect to the images captured by the image acquisition device 200. That is, the suspicion detection device 300 determines the presence of an abnormality occurrence possibility on the basis of the image captured by the image acquisition device 200. Specifically, the suspicion detection device 300 calculates a score of the image captured by the image acquisition device 200 for respective categories. The categories are determined by categorizing abnormalities. The score is an evaluation value indicating the occurrence possibility of an abnormality categorized in each of the categories. The suspicion detection device 300 determines that the abnormality occurrence possibility is present when the score is equal to or larger than a threshold in any one or more categories.

The suspicion detection device 300 may function as an image accumulation device and accumulate the images captured by the image acquisition device 200 as image data. The suspicion detection device 300 may accumulate the images captured by the image acquisition device 200 as they are. Alternatively, the suspicion detection device 300 may accumulate a predetermined period of images before and after an image for which an abnormality occurrence possibility is determined. When the suspicion detection device 300 accumulates a predetermined period of images before and after the image for which an abnormality occurrence possibility is determined, it is possible to reduce a storage capacity of the suspicion detection device 200 as the image accumulation device and reduce a retrieval time when retrieving images.

The suspicion detection device 300 is configured to include a computer, for example.

The suspicion detection device 300 is configured as an edge-side device. However, the suspicion detection device 300 may be configured as a cloud-side device.

The number of suspicion detection devices 300 included in the notification system 1 may be one or more. Moreover, the number of image acquisition devices 200 that acquire images processed by each of the suspicion detection devices 300 may be one or more.

The abnormality determination device 400 acquires a determination result on the presence of an abnormality on the basis of the image for which the suspicion detection device 300 has determined that the abnormality occurrence possibility is present. Specifically, the abnormality determination device 400 displays an image for which the suspicion detection device 300 has determined that the abnormality occurrence possibility is present and acquires a determination result on the presence of an abnormality by the user of the abnormality determination device 400. In the abnormality determination device 400, a determiner such as a manager of a store refers to a notification screen including an image determined by the suspicion detection device 300 to perform determination by performing an operation such as selecting categories defined in advance or creating a new category.

However, the abnormality determination device 400 may acquire information indicating the presence of an abnormality occurrence possibility from the suspicion detection device 300 instead of the image for which it is determined that the abnormality occurrence possibility is present. Alternatively, the abnormality determination device 400 may acquire information indicating any one or both of a place and a time point where an abnormality may have occurred instead of the image for which it is determined that the abnormality occurrence possibility is present. In this case, a determiner visits the place where an abnormality may have occurred or refers to an image of a monitoring camera capturing the place where an abnormality may have occurred to determine the presence of an abnormality, and the determiner inputs a determination result to the abnormality determination device 400.

Moreover, the abnormality determination device 400 functions as a report requesting device and sends a report request to the learning device 100 upon acquiring a determination result indicating the presence of an abnormality.

The abnormality determination device 400 is configured to include a portable communication terminal device such as a smartphone or a portable phone, for example. For example, an abnormality presence determiner such as a store manager or a vice store manager uses a portable terminal device as the abnormality determination device 400 to determine whether an abnormality (an abnormal situation) is shown in a screen displayed by the portable terminal device and performs a user operation of inputting a determination result. The abnormality determination device 400 corresponds to an example of a determination device.

The abnormality determination device 400 may be a device capable of displaying an image to acquire a determination result on the presence of an abnormality. For example, the abnormality determination device 400 may be configured to include a personal computer (PC) installed in a store manager's office.

The network 900 relays communication between the learning device 100 and the suspicion detection device 300 and communication between the learning device 100 and the abnormality determination device 400. For example, the network 900 is configured as a combination of the Internet and a cellular phone network. The cellular phone network mentioned herein is a radio communication network that a communication provider provides for smartphones and mobile phones. However, a communication form between devices that form the notification system 1 is not limited to a specific communication form. For example, the network 900 may be a communication network other than the LAN, the Internet, and the cellular phone network. Alternatively, the learning device 100, the suspicion detection device 300, and the abnormality determination device 400 may communicate directly with each other without a communication network.

A device configuration of the notification system 1 is not limited to the configuration described with reference to FIG. 1. For example, at least one of the notification destination determination device and the reporting device may be configured as an independent device. Alternatively, the functions of at least one of the notification destination determination device and the reporting device may be realized in the suspicion detection device 300 or the abnormality determination device 400. Moreover, the image accumulation device may be configured as an independent device. Alternatively, the functions of the image accumulation device may be realized in the image acquisition device 200 or the learning device 100.

Figure 2:
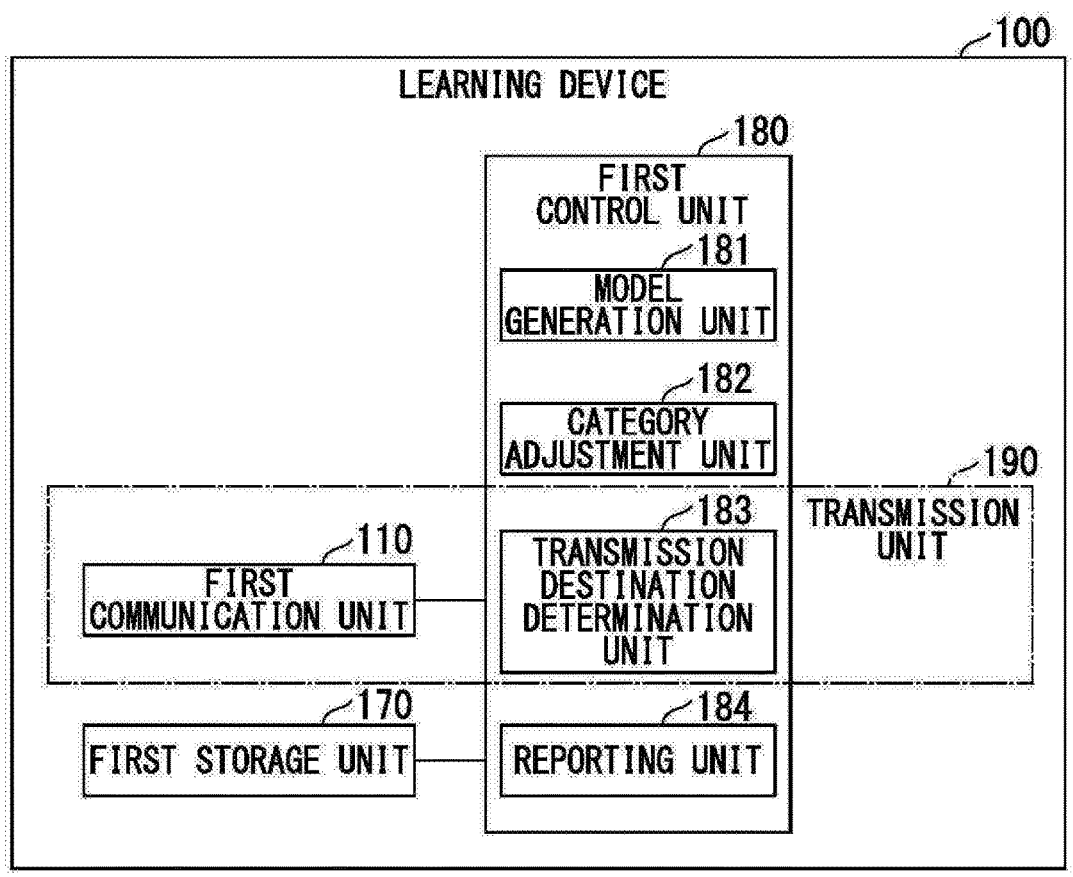
FIG. 2 is a block diagram showing a functional configuration of a learning device according to the embodiment.

FIG. 2 is a block diagram showing a functional configuration of the learning device 100. As shown in the drawing, the learning device 100 includes a first communication unit 110, a first storage unit 170, and a first control unit 180. The first control unit 180 includes a model generation unit 181, a category adjustment unit 182, a transmission destination determination unit 183, and a reporting unit 184.

The first communication unit 110 communicates with the suspicion detection device 300 and the abnormality determination device 400 via the network 900. The first communication unit 110 outputs (transmits) a suspicion detection model generated by the model generation unit 181 to the suspicion detection device 300 as model data. Moreover, the first communication unit 110 acquires (receives) the suspicious image and category candidates from the suspicion detection device 300. The suspicious image is an image for which it is determined that the abnormality occurrence possibility is present. The category candidates are candidates for a category of an abnormality which may be photographed in a suspicious image. The first communication unit 110 transmits the acquired suspicious image and the acquired category candidates to the abnormality determination device 400 which is determined as a transmission destination by the transmission destination determination unit 183. Moreover, the first communication unit 110 transmits a transmission request for the suspicious image to the suspicion detection device 300 and receives image data transmitted by the suspicion detection device 300 in response to the transmission request. Moreover, the first communication unit 110 receives a determination result on the presence of an abnormality from the abnormality determination device 400. Furthermore, the first communication unit 110 receives a report request from the abnormality determination device 400 and transmits a report based on the report request to a predetermined transmission destination (a report destination).

The first storage unit 170 stores various types of data. The first storage unit 170 is realized using a storage device included in the learning device 100.

The first control unit 180 controls each units of the learning device 100 to execute various functions. The first control unit 180 is realized when a central processing unit (CPU) included in the learning device 100 reads a program from the first storage unit 170 and executes the program.

The model generation unit 181 generates model data used for extracting images by machine learning. Specifically, the model generation unit 181 generates model data that the suspicion detection device 300 uses for a suspicion detection process for respective categories. As described above, the suspicion detection device 300 calculates scores for respective categories using the model indicated by the model data and determines that the abnormality occurrence possibility is present when the score is equal to or larger than a threshold for any one or more categories.

The model generation unit 181 generates model data using a partial image in which the abnormality is included within the suspicious image for which it is determined that the abnormality occurrence possibility is present. The partial image in which an abnormality is included is an image of a portion in which the abnormality is photographed within the suspicious image. In this manner, since the model generation unit 181 performs learning using the partial image in which an abnormality is included, the model generation unit 181 can extract the features of an image in which an abnormality is included more accurately. In this respect, the model generation unit 181 can perform learning with higher accuracy. Clipping of a partial image in which an abnormality is included is performed by a partial image clipping unit 384 (to be described later) of the suspicion detection device 300.

An algorithm of the machine learning performed by the model generation unit 181 may be an algorithm capable of categorizing images into categories and various algorithms can be used. For example, the model generation unit 181 may perform machine learning using an existing learning algorithm such as a support vector machine or a neural network (for example, back propagation).

The category adjustment unit 182 adjusts the categories into which abnormalities are categorized so that a number of pieces of learning data (teaching data) necessary for learning are included in each category. Specifically, when the number of pieces of learning data included in a certain category is insufficient, the category adjustment unit 182 generates a category in which one category and categories similar to that category are combined as subcategories. That is, when a first category in which the number of pieces of learning data corresponding to the category is smaller than a predetermined number is detected from a plurality of categories, the category adjustment unit 182 calculates similarity between the first category and other categories and puts the first category and one or more second categories having high similarity together as one category.

Examples of categories of an abnormality in a store include shoplifting, a fraudulent operation on a cash register, and entry to a forbidden area. Examples of a subcategory of shoplifting include concealing goods in a bag and concealing goods in one's clothes. Examples of a subcategory of a fraudulent operation on a cash register include not passing goods through a cash register, passing goods through a cash register while covering a barcode with something, and passing the same packages through a cash register a number of times so that the barcode of only one of the goods is read by the cash register. Examples of a subcategory of entry to a forbidden area include an action of climbing over a shelf and an action of entering an employee's office.

In order to combine categories in this manner, the category adjustment unit 182 evaluates similarity of categories.

Specifically, the category adjustment unit 182 applies the score calculated by the suspicion detection device 300 to the images of the learning data for all categories. The category adjustment unit 182 evaluates that a category for which the obtained score is equal to or larger than a threshold is similar to the category of the learning data.

For example, when there are categories A to E, the category adjustment unit 182 randomly selects an image from pieces of teaching data of the category A. The category adjustment unit 182 transmits the selected image to the suspicion detection device 300 via the first communication unit 110. The suspicion detection device 300 calculates the score for each of categories A to E and transmits (replies with) the calculated scores to the learning device 100.

For example, when the scores of the respective categories are 95% for the category A, 30% for the category B, 2% for the category C, 80% for the category D, and 45% for the category E and the threshold is 70%, the category adjustment unit 182 evaluates that the categories A and D are similar.

The categories evaluated to be similar are candidates for categories which are to be put together when the number of pieces of learning data is small. For example, when the categories A and D are put together, the category adjustment unit 182 generates subcategories A and D from the categories A and D and puts the subcategories A and D together to generate a new category F.

However, an algorithm with which the category adjustment unit 182 evaluates the similarity of categories may be an algorithm capable of calculating similarity of images and various algorithms can be used. Similarity of images is similarity of actions included in images and actions photographed in images, for example. An existing algorithm may be used as an algorithm with which the category adjustment unit 182 evaluates similarity of categories. For example, a similar image retrieving method which uses any one or a combination of a color feature, a texture, and a shape as a feature amount can be used as an algorithm with which the category adjustment unit 182 evaluates the similarity of categories.

When one category includes a plurality of subcategories and all subcategories include a number of pieces of learning data necessary for learning, the category adjustment unit 182 subdivides the category into subcategories and raises the levels of the subcategories to the level of categories. That is, the category adjustment unit 182 measures the number of pieces of learning data corresponding to each of a plurality of subcategories put together as one category. When it is determined for all subcategories that the number of pieces of learning data is equal to or larger than a predetermined number, the category adjustment unit 182 subdivides the plurality of subcategories put together as one category to generate categories from the respective subcategories.

The category adjustment unit 182 acquires a suspicious image and information indicating a category corresponding to an action of a target included in the suspicious image among a plurality of categories set as categories (categories into which abnormalities are categorized) of an action of the target. The category adjustment unit 182 correlates the image and the category indicated by the information with each other.

The transmission destination determination unit 183 determines a transmission destination of the image or the information on the image on the basis of the suspicious image.

For example, the transmission destination determination unit 183 determines a person other than a person included in the suspicious image as a notification destination of an abnormality occurrence possibility depending on the person included in the suspicious image. Here, when a fraudulent action is committed in a store, even if a person directly involved in the fraudulent action or a friend thereof is notified of the possibility of a fraudulent action, it is considered that the person having received the notification will ignore the notification or conceal the receipt of the notification. Therefore, it is highly likely that notification of the possibility of the fraudulent action cannot improve the situation. Moreover, a person included in the suspicious image is relatively highly likely to be the person directly involved in the fraudulent action or a friend thereof because the person was in the place of the fraudulent action.

Therefore, the transmission destination determination unit 183 determines a person other than the person included in the suspicious image as the notification destination of the abnormality occurrence possibility. In this way, the transmission destination determination unit 183 can transmit a notification to a person who is less likely to be a person directly involved in the fraudulent action or a friend thereof, and in this respect, can increase the possibility of improving the situation.

For example, when a store manager is included in the suspicious image, the transmission destination determination unit 183 determines an abnormality determination device of a vice store manager as the notification destination.

The transmission destination determination unit 183 may determine a person included in the suspicious image as the notification destination as well as a person other than the person included in the suspicious image. It is possible to expect a warning effect by notifying the person directly involved in the fraudulent action or a friend thereof, and in this respect, there is a possibility that the situation will be improved.

The transmission destination determination unit 183 may determine a transmission destination address of an email as the notification destination (a transmission destination). Alternatively, the transmission destination determination unit 183 may determine identification information of the abnormality determination device 400 of the notification destination as the notification destination. For example, when the abnormality determination device 400 is a smartphone or a portable phone, the transmission destination determination unit 183 may determine a telephone number or an IMSI (International Mobile Subscriber Identity) of the abnormality determination device 400 of the notification destination as the notification destination.

The transmission destination determination unit 183 may determine the transmission destination of the suspicious image or the information on the suspicious image on the basis of information on a time point or a place where the suspicious image was captured instead of the suspicious image. For example, the transmission destination determination unit 183 may determine the transmission destination on the basis of a time point at which the suspicious image was captured and a working hours of an employee so that an employee whose working hours does not correspond to the time point at which the image was captured is determined as the transmission destination.

A transmission unit 190 that combines the transmission destination determination unit 183 and the first communication unit 110 functions as a notification destination determination device. Specifically, the transmission destination determination unit 183 determines the transmission destination of an image or the information on the image according to information on a target, and the first communication unit 110 transmits the image or the information on the image to the transmission destination. The transmission unit 190 determines a transmission destination different from a transmission destination correlated with a person included in the suspicious image as a transmission destination of the image or the information on the image as described above. The person included in the suspicious image corresponds to an example of a target specified by a specifying unit 382 (to be described later) of the suspicion detection device 300.

The transmission unit 190 transmits a plurality of images captured in a predetermined period of time including the capturing time point of the suspicious image. The plurality of images captured in the predetermined period of time include the suspicious image and images captured before and after the time point at which the suspicious image was captured, for example. Alternatively, the transmission unit 190 may transmit information on the plurality of images, for example. The information on the plurality of images indicates an access destination for acquiring the plurality of images, for example.

The transmission unit 190 transmits information indicating a category correlated with the image in addition to the suspicious image. The information indicating the category correlated with the suspicious image is information indicating a candidate of a type of an abnormality included in the image. The information indicating the category corresponds to an example of information on the model data used for extracting images.

The learning device 100 corresponds to an example of a second information processing device in a respect that the learning device 100 includes the transmission unit 190. The transmission unit 190 corresponds to an example of a transmission unit of a second information processing device.

The reporting unit 184 reports the occurrence of an abnormality to a predetermined transmission destination via the first communication unit 110 according to a report request from the abnormality determination device 400. In this manner, a combination of the first communication unit 110 and the reporting unit 184 functions as a reporting device.

Figure 3:
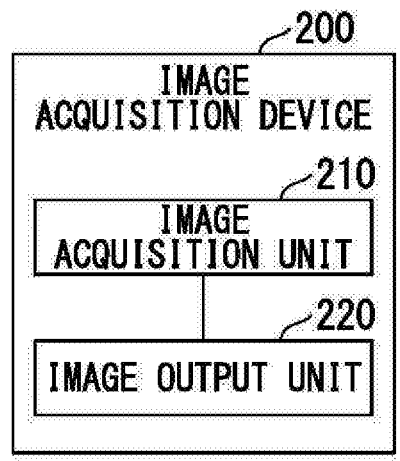
FIG. 3 is a block diagram showing a functional configuration of an image acquisition device according to the embodiment.

FIG. 3 is a block diagram showing a functional configuration of the image acquisition device 200. As shown in the drawing, the image acquisition device 200 includes an image acquisition unit 210 and an image output unit 220.

The image acquisition unit 210 is configured to include a camera and captures the images of the inside of a monitoring target store. The image acquisition unit 210 may capture a moving image and may capture a still image.

The image output unit 220 outputs (transmits) the images captured by the image acquisition unit 210 to the suspicion detection device 300 as image data.

Figure 4:
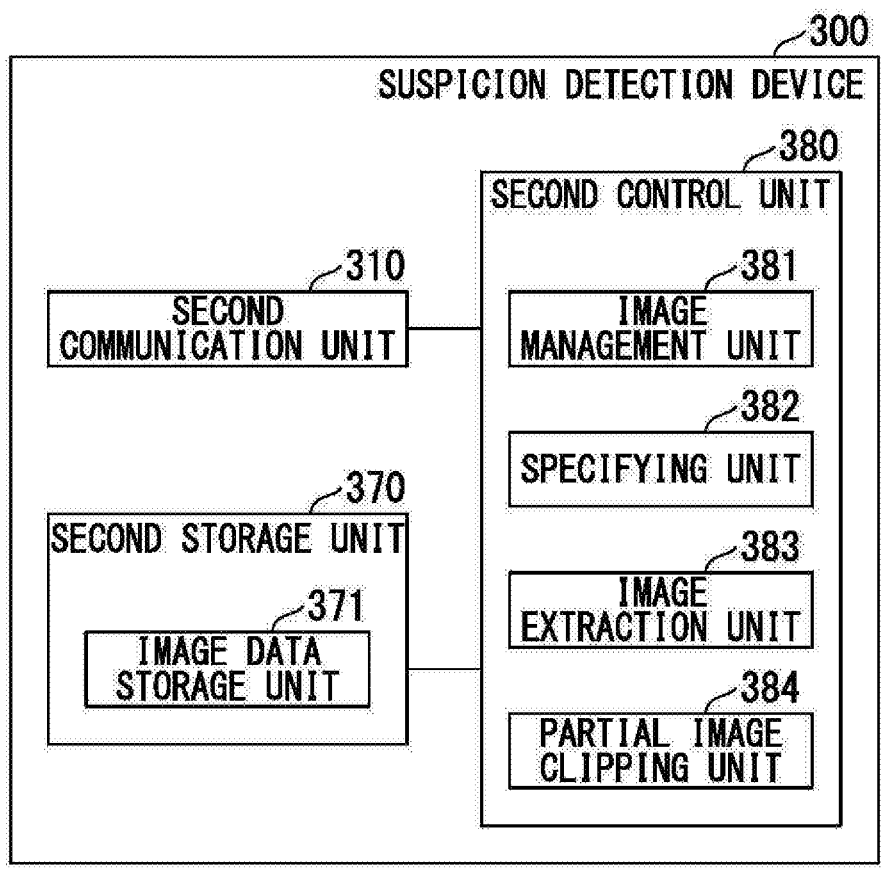
FIG. 4 is a block diagram showing a functional configuration of a suspicion detection device according to the embodiment.

FIG. 4 is a block diagram showing a functional configuration of the suspicion detection device 300. As shown in the drawing, the suspicion detection device 300 includes a second communication unit 310, a second storage unit 370, and a second control unit 380. The second storage unit 370 includes an image data storage unit 371. The second control unit 380 includes an image management unit 381, a specifying unit 382, an image extraction unit 383, and a partial image clipping unit 384.

The second communication unit 310 communicates with the image output unit 220 of the image acquisition device 200. The second communication unit 310 receives image data transmitted by the image output unit 220.

The second communication unit 310 communicates with the first communication unit 110 of the learning device 100 via the network 900. The second communication unit 310 receives model data transmitted by the first communication unit 110. Moreover, the second communication unit 310 transmits a suspicious image and category candidates to the first communication unit 110.

The second communication unit 310 receives an image transmission request from the first communication unit 110 and transmits image data as a response to the transmission request. The image transmission request is a suspicious image transmission request.

The second storage unit 370 stores various types of data. The second storage unit 370 is realized using a storage device included in the suspicion detection device 300.

The image data storage unit 371 accumulates (stores) the images captured by the image acquisition unit 210 as image data.

The second control unit 380 controls each units of the suspicion detection device 300 to execute various functions. The second control unit 380 is realized when a CPU included in the suspicion detection device 300 reads a program from the second storage unit 370 and executes the program, for example.

The image management unit 381 manages the image data stored by the image data storage unit 371. When the second communication unit 310 receives image data of the images captured by the image acquisition unit 210, the image management unit 381 stores the image data in the image data storage unit 371. Moreover, when the second communication unit 310 receives an image transmission request from the learning device 100, the image management unit 381 searches the image data storage unit 371 to read image data corresponding to the image transmission request and transmits the image data to the learning device 100 via the second communication unit 310.

A combination of the image data storage unit 371 and the image management unit 381 functions as an image accumulation device.

The specifying unit 382 specifies a target from an image. Specifically, the specifying unit 382 determines whether a person included in an image corresponds to any one of persons registered in advance or not.

However, a method by which the specifying unit 382 specifies a target is not limited to the method based on image recognition. For example, the specifying unit 382 may specify an employee whose working hours corresponds to a time when an image was captured on the basis of the working hours of the employee and the time when the image was captured. Alternatively, the specifying unit 382 may specify an employ who is responsible for an area including a capturing range of the image acquisition device 200 that has captured the image on the basis of the capturing range.

The suspicion detection device 300 corresponds to an example of a first information processing device in a respect that the suspicion detection device 300 includes the specifying unit 382 and the second communication unit 310. A combination of the specifying unit 382 and the second communication unit 310 corresponds to an example of an output unit of the first information processing device.

The image extraction unit 383 extracts images in which a target is included. Specifically, the image extraction unit 383 extracts images in which a target is included using the model data generated by machine learning of the model generation unit 181. More specifically, a score is calculated with respect to the captured image by the image acquisition device 200 for each of the categories. The image extraction unit 383 calculates the scores for each of the categories using the model data generated for respective categories by the model generation unit 181. The image extraction unit 383 determines that the abnormality occurrence possibility is present when the score is equal to or larger than a threshold for any one or more categories. By this determination, the image extraction unit 383 extracts a specific image from the images captured by the image acquisition unit 210.

Furthermore, the image extraction unit 383 extracts image data of the images by reading a plurality of images captured in a predetermined period of time including the capturing time point of an image for which it is determined that the abnormality occurrence possibility is present from the image data storage unit 371 via the image management unit 381. When the image extraction unit 383 extracts the image for which it is determined that the abnormality occurrence possibility is present as well as images captured in a predetermined period of time including the capturing time point of the image, the user who refers to the images can understand the actions of the person included in the image in a time-series manner. In this way, the user can easily understand the actions of the person included in the image.

The partial image clipping unit 384 clips and acquires a partial image in which the action of a target used for generating model data appears within the suspicious image. For example, a determiner who determines the presence of an abnormality refers to an image for which it is determined that the abnormality occurrence possibility is present using the abnormality determination device 400 and designates a portion in which the abnormality is photographed when it is determined that an abnormality is present. The partial image clipping unit 384 clips a partial image of the portion designated by the determiner.

Figure 5:
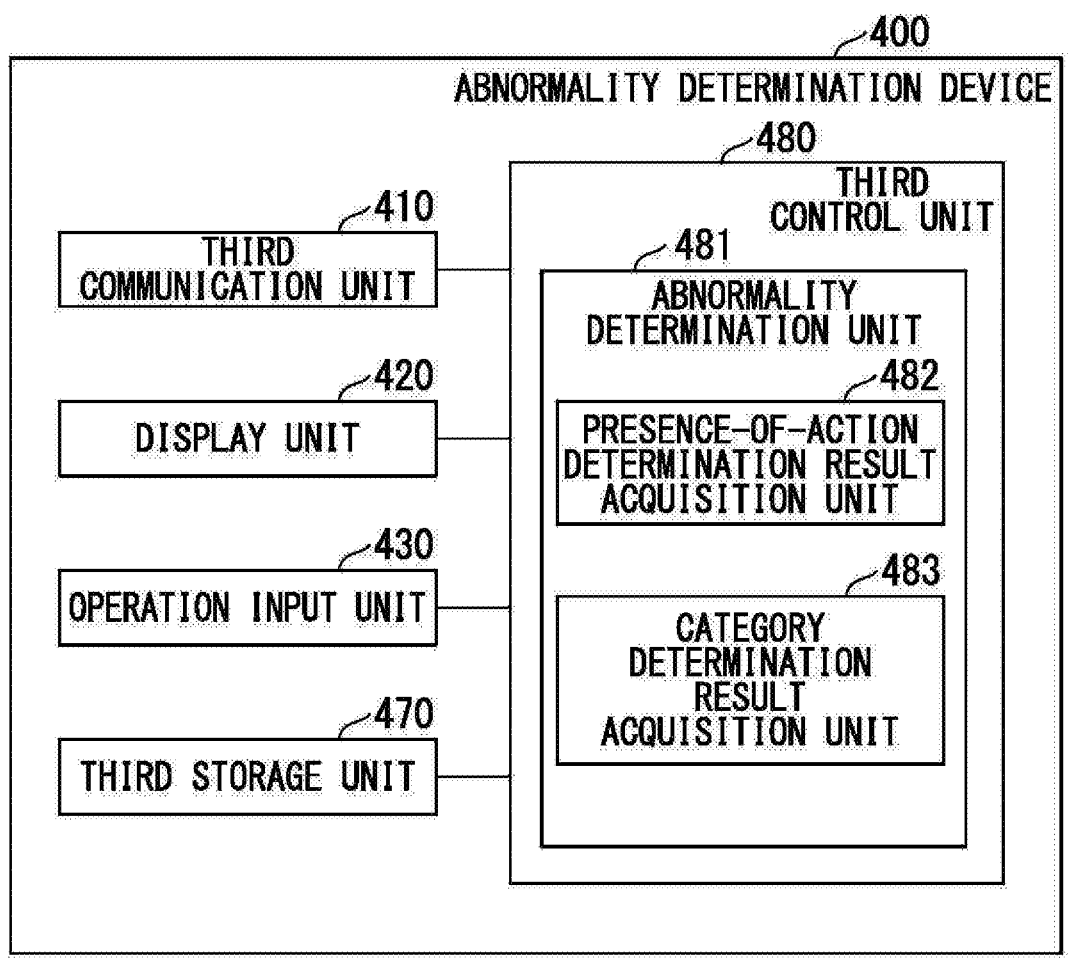
FIG. 5 is a block diagram showing a functional configuration of an abnormality determination device according to the embodiment.

FIG. 5 is a block diagram showing a functional configuration of the abnormality determination device 400. As shown in the drawing, the abnormality determination device 400 includes a third communication unit 410, a display unit 420, an operation input unit 430, a third storage unit 470, and a third control unit 480. The third control unit 480 includes an abnormality determination unit 481. The abnormality determination unit 481 includes a presence-of-action determination result acquisition unit 482 and a category determination result acquisition unit 483.

The third communication unit 410 communicates with the first communication unit 110 via the network 900. The third communication unit 410 receives the suspicious image and the category candidates transmitted by the first communication unit 110. Moreover, the third communication unit 410 transmits a determination result on the presence of an abnormality to the first communication unit 110. When it is determined that an abnormality is present, the third communication unit 410 transmits the category of the abnormality and information indicating a portion in which an abnormality is photographed within the suspicious image as a determination result. The model generation unit 181 performs machine learning using the determination result as learning data and generates a model.

Moreover, when it is determined that an abnormality is present, the third communication unit 410 transmits an abnormality report request to the first communication unit 110.

The display unit 420 has a display screen such as a liquid crystal panel, for example, and displays various images. The display unit 420 displays the suspicious image and information on the suspicious image. For example, the display unit 420 may display the suspicious image and may display an access destination for acquiring the suspicious image.

The operation input unit 430 has an input device such as a touch sensor that is provided in the display screen of the display unit 420, for example, to form a touch panel and receives a user operation. The operation input unit 430 receives a user operation indicating the determination result on the presence of an abnormality in the suspicious image. The presence of an abnormality in the suspicious image is the presence of a fraudulent action, for example. Moreover, when an abnormality is photographed in the suspicious image, the operation input unit 430 receives a user operation indicating the portion in which the abnormality is photographed.

However, a method of allowing the abnormality determination device 400 to detect a portion in which an abnormality is photographed within the image is not limited to the method of receiving a user operation. For example, the abnormality determination device 400 may detect a portion where a change occurs on the basis of a background difference between images captured previously and subsequently as a portion in which an abnormality is photographed. Alternatively, the abnormality determination device 400 may detect the gaze of a determiner and may detect a portion that the determiner is gazing as a portion in which an abnormality is photographed.

The third storage unit 470 stores various types of data. The third storage unit 470 is realized using a storage device included in the abnormality determination device 400.

The third control unit 480 controls each units of the abnormality determination device 400 to execute various functions. The third control unit 480 is realized when a CPU included in the abnormality determination device 400 reads a program from the third storage unit 470 and executes the program, for example.

The abnormality determination unit 481 corresponds to an example of a determination unit and determines a suspicious image or information on the suspicious image. Specifically, the abnormality determination unit 481 determines whether an abnormality is photographed in the suspicious image.

The presence-of-action determination result acquisition unit 482 acquires a determination result as to whether the suspicious image or the information on the suspicious image displayed on the display unit 420 is the image or the information when an action serving as the target of the machine learning was performed. Specifically, the user of the third control unit 480 performs an operation of inputting a determination result using the operation input unit 430, and the presence-of-action determination result acquisition unit 482 acquires a determination result on the presence of an abnormality indicated by the input operation.

When it is determined that the suspicious image or the information on the suspicious image displayed by the display unit 420 is the image or the information when an action serving as a target of the machine learning was performed, the category determination result acquisition unit 483 acquires a determination result on a category corresponding to the action. Specifically, the user of the third control unit 480 determines a category corresponding to an image appearing in the suspicious image and performs an operation of inputting the determination result using the operation input unit 430. The category determination result acquisition unit 483 acquires a category determination result indicated by the input operation.

The first communication unit 110 of the learning device 100 corresponds to an example of an information acquisition unit. For example, the first communication unit 110 receives identification information for identifying a person specified by the specifying unit 382 of the suspicion detection device 300. The identification information for identifying the person specified by the specifying unit 382 corresponds to an example of information on a target included in an image.

The suspicion detection device 300 instead of the learning device 100 may determine the transmission destination of the suspicious image or the information on the suspicious image. For example, the suspicion detection device 300 may include a transmission destination determination unit. The transmission destination determination unit provided in the suspicion detection device 300 performs the same process as the process performed by the transmission destination determination unit 183 provided in the learning device 100. In this case, the transmission destination determination unit of the suspicion detection device 300 corresponds to an example of an information acquisition unit acquiring information from the specifying unit 382.

Figure 6:
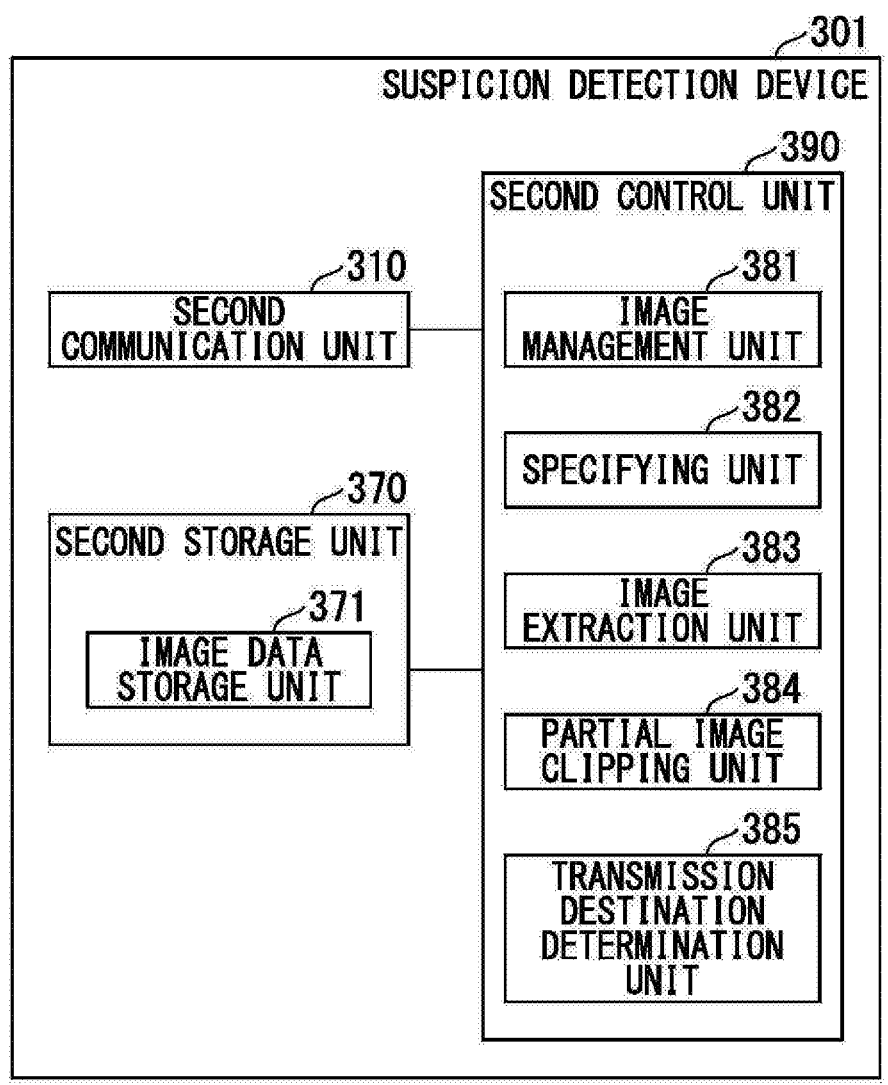
FIG. 6 is a block diagram showing a functional configuration of a modification of a suspicion detection device according to the embodiment.

FIG. 6 is a block diagram showing a functional configuration of a suspicion detection device 301 which is a modification of the suspicion detection device 300.

As shown in the drawing, the suspicion detection device 301 includes a second communication unit 310, a second storage unit 370, and a second control unit 380. The second storage unit 370 includes an image data storage unit 371. The second control unit 380 includes an image management unit 381, a specifying unit 382, an image extraction unit 383, a partial image clipping unit 384, and a transmission destination determination unit 385.

Portions in FIG. 6 which correspond to the respective units in FIG. 4 and have the same functions thereof will be denoted by the same reference numerals (310, 370, 371, 381, 382, 383, and 384). The suspicion detection device 301 is different from the suspicion detection device 300 shown in FIG. 4 in that the suspicion detection device 301 includes the second control unit 390 instead of the second control unit 380. The second control unit 390 is different from the second control unit 380 in that the second control unit 390 further includes the transmission destination determination unit 385 in addition to the units included in the second control unit 380 shown in FIG. 4.

The transmission destination determination unit 385 determines a transmission destination of the suspicious image or the information on the image on the basis of the suspicious image similarly to the transmission destination determination unit 183 shown in FIG. 2. For example, as described above, the specifying unit 382 specifies a target from an image, and the transmission destination determination unit 385 determines a transmission destination of the suspicious image or the information on the suspicious image on the basis of the target specified by the specifying unit 382.

The transmission destination determination unit 385 may determine the transmission destination of the suspicious image or the information on the suspicious image on the basis of the information on the time point or the place where the suspicious image was captured instead of the suspicious image similarly to the transmission destination determination unit 183.

The suspicion detection device 301 corresponds to an example of an information processing device.

An application range of the notification system 1 is not limited to monitoring of a store. The notification system 1 can be used in various uses in which a transmission destination of an obtained image or the information on the image is selected according to the obtained image.

For example, the notification system 1 may detect a specific motion such as a fall of a person. When a fall of a person is detected, the notification system 1 may notify a relief center of the detection of a fall. In this case, for example, an information acquisition unit acquires at least one of pieces of information such as a "feature amount of a person" and a "fall" as information on a target included in an image. The transmission unit determines that the fall is to be transmitted to the relief center according to at least one of pieces of information such as a "feature amount of a person" and a "fall" which is information on the target. Furthermore, the transmission unit transmits an image in which a fall of a person is captured, a capturing time point at which the image was captured, and a capturing place of the image to the relief center as the information on the image.

Alternatively, the notification system 1 may detect a specific object such as a lost object. When a lost object is detected (found), the notification system 1 may notify a lost object handling department such as a service counter of the finding of a lost object. In this case, for example, an information acquisition unit acquires a "feature amount of a lost object" as information on the target included in an image. The transmission unit determines that the finding of the lost object is to be transmitted to a lost object handling department such as a service counter according to the "feature amount of a lost object" which is the information on the object. Furthermore, the transmission unit transmits the captured image of the lost object, the capturing time point, and the capturing place to the lost object handling department such as a service counter as the information on the image. The "feature amount of a lost object" is acquired, for example, by performing pattern matching on the image acquired by the image acquisition device 200 using the image of the lost object.

Alternatively, the notification system 1 may detect a specific person such as a missing child. When a missing child is detected (found), the notification system 1 may notify a missing child caring department such as a service counter or the parent of the missing child of the finding of the missing child. In this case, for example, an information acquisition unit acquires a "feature amount of a person" as the information on a target included in an image. A transmission unit determines that the finding of the missing child is to be transmitted to a lost object caring department such as a service counter according to the "feature amount of a person" which is the information on the target. Furthermore, the transmission unit transmits the captured image of the missing child, the capturing time point, and the capturing place to the missing child caring department such as a service counter or the parent of the missing child as the information on the image. The "feature amount of the person" is acquired, for example, by performing pattern matching on the image acquired by the image acquisition device 200 using the image of the person.

Next, the operation of the notification system 1 will be described with reference to FIGS. 7 to 9.

Figure 7:
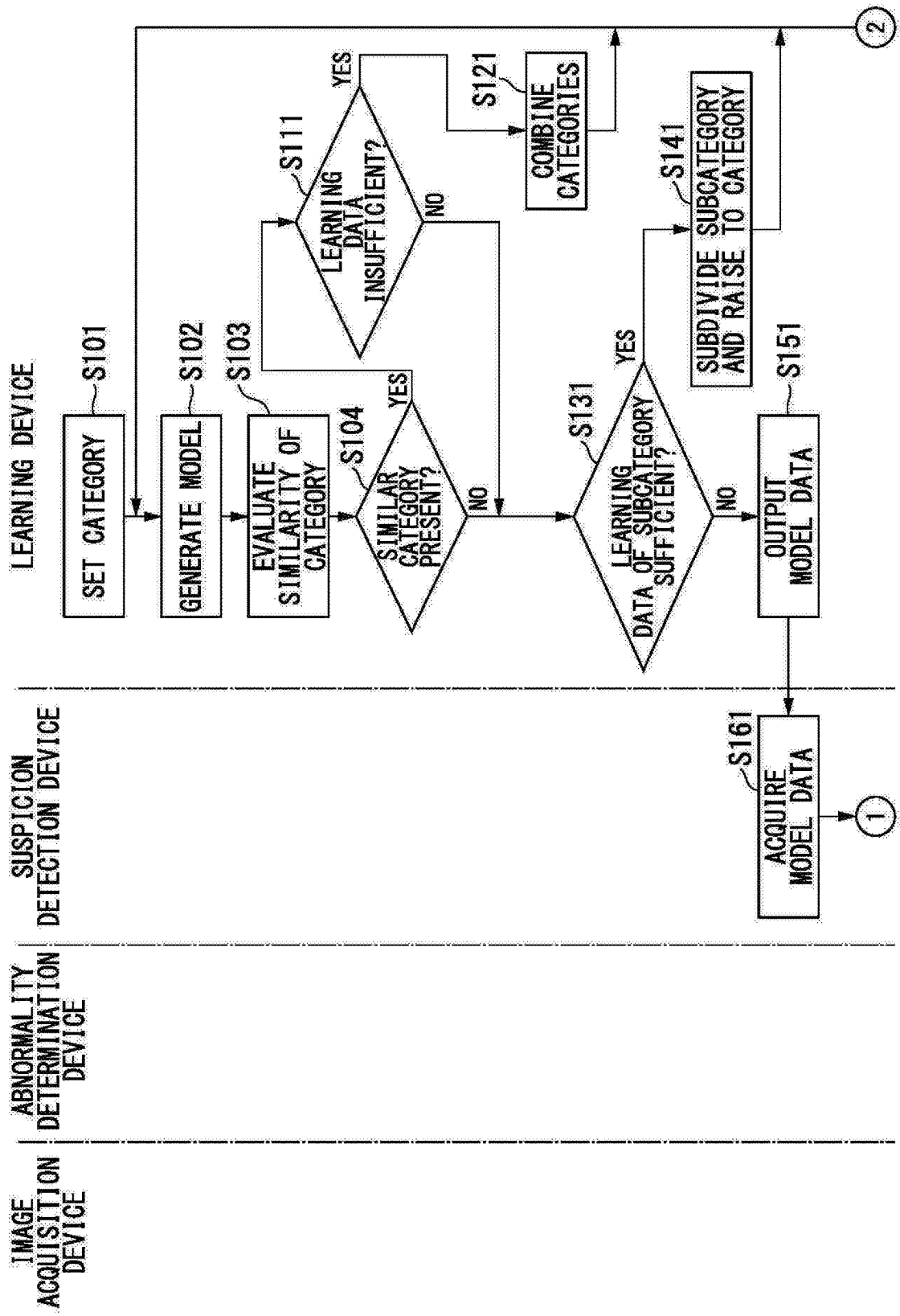
FIG. 7 is a first flowchart showing a processing example performed by the notification system according to the embodiment.
Figure 8:
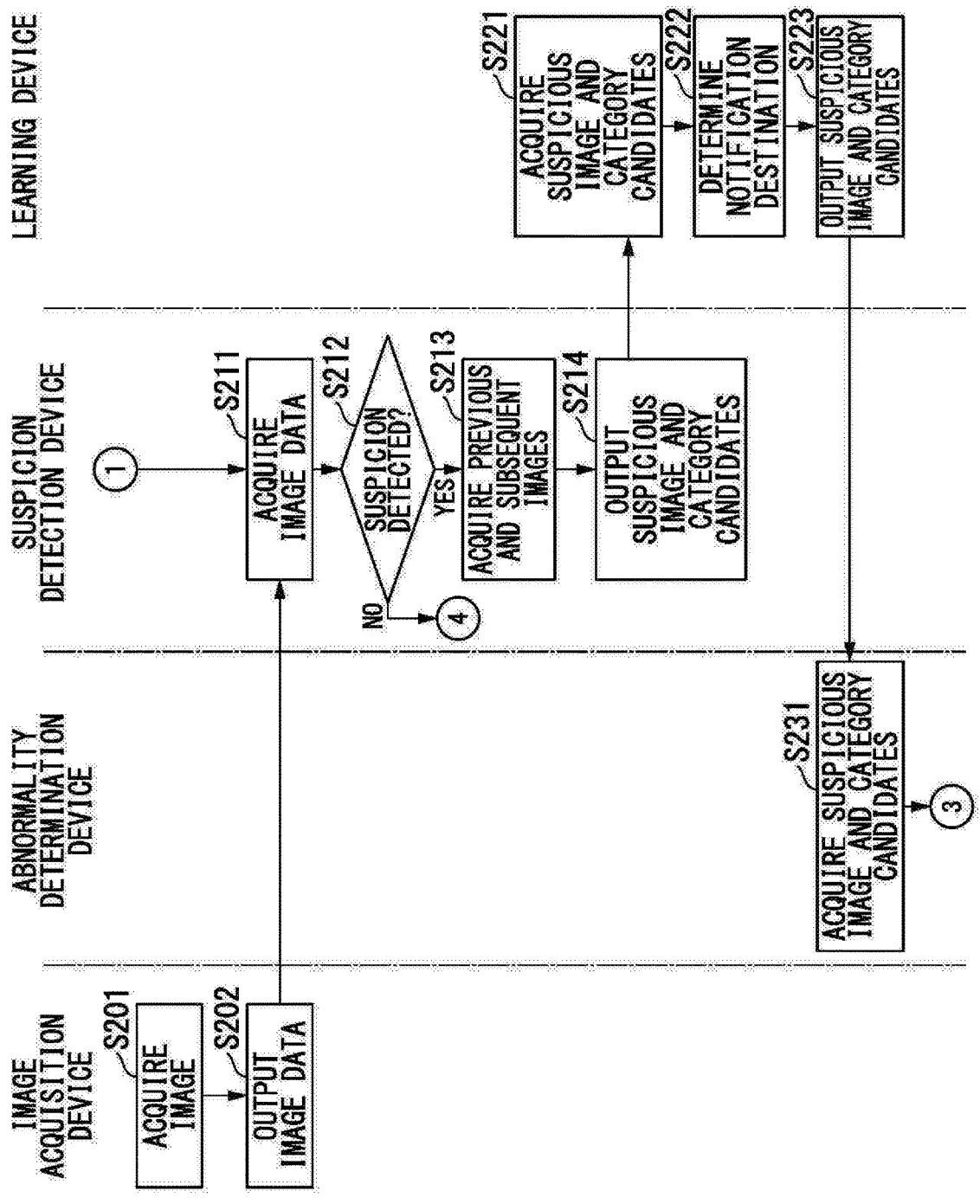
FIG. 8 is a second flowchart showing a processing example performed by the notification system according to the embodiment.
Figure 9:
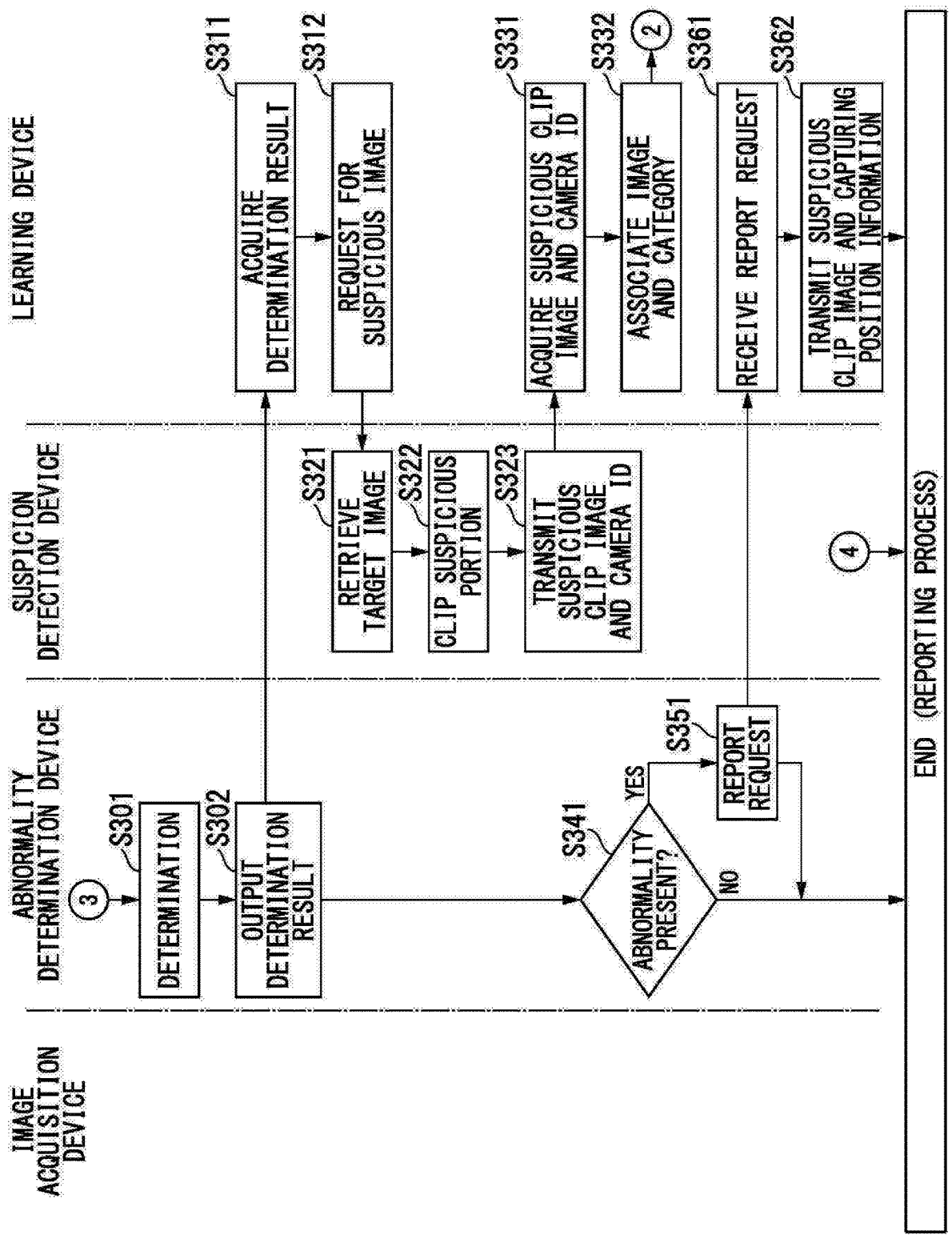
FIG. 9 is a third flowchart showing a processing example performed by the notification system according to the embodiment.

FIGS. 7 to 9 are flowcharts showing a processing example performed by the notification system 1.

In steps S101 to S151 in the drawings, the learning device 100 generates a model in advance.

First, the category adjustment unit 182 sets a category (step S101). For example, an administrator of the notification system 1 performs a user operation of setting a category, and the category adjustment unit 182 sets a category according to the user operation.

Subsequently, the model generation unit 181 generates a model (step S102). Specifically, the model generation unit 181 performs machine learning using learning data in which an image and a category are correlated and generates a model for respective categories.

Subsequently, the category adjustment unit 182 evaluates similarity of categories (step S103). For example, the category adjustment unit 182 extracts feature information (for example, a feature vector) for respective categories from the model for respective categories generated by the model generation unit 181 and evaluates a similarity of categories by evaluating the similarity of the feature information.

The category adjustment unit 182 determines the presence of similar categories on the basis of the similarity of categories obtained in step S103 (step S104). For example, the category adjustment unit 182 determines the presence of similar categories which are a set of categories of which the similarity is equal to or larger than a predetermined threshold.

When it is determined that similar categories are present (step S104: YES), the category adjustment unit 182 determines whether the number of pieces of learning data included in at least one similar category among the similar categories is insufficient (step S111). For example, the category adjustment unit 182 determines whether the number of pieces of learning data is equal to or larger than a predetermined threshold for each of the similar categories. When a category in which the number of pieces of learning data is smaller than the threshold is detected, the category adjustment unit 182 determines that the number of pieces of learning data is insufficient. On the other hand, when it is determined that the number of pieces of learning data is equal to or larger than the threshold for all categories included in the similar categories, the category adjustment unit 182 determines that the number of pieces of learning data necessary for learning categories is sufficient.

When it is determined that the number of pieces of learning data is insufficient (step S111: YES), the category adjustment unit 182 combines categories (step S121). Specifically, the category adjustment unit 182 generates subcategories from the categories which are determined to be similar categories and puts these subcategories together as one category.

After step S121, the flow returns to step S102.

On the other hand, when it is determined in step S104 that a similar category is not present (step S104: NO), the category adjustment unit 182 determines whether the number of pieces of learning data of each subcategory is sufficient for the category formed by combining the subcategories (step S131). Specifically, the category adjustment unit 182 determines whether the number of pieces of learning data is equal to or larger than a predetermined threshold for each of the subcategories included in one category. When it is determined that the number of pieces of learning data is equal to or larger than the threshold for all subcategories, the category adjustment unit 182 determines that the number of pieces of learning data is sufficient. On the other hand, when it is determined that the number of pieces of learning data is smaller than the threshold for any one of the subcategories, the category adjustment unit 182 determines that the number of pieces of learning data is insufficient.

Even when it is determined in step S111 that the learning data is sufficient (step S111: NO), the category adjustment unit 182 proceeds to step S131.

When it is determined in step S131 that the number of pieces of learning data is sufficient (step S131: YES), the category adjustment unit 182 subdivides the category into subcategories and raises the levels of the subcategories to the levels of categories (step S141).

After step S141, the category adjustment unit 182 returns to step S102.

On the other hand, when it is determined in step S131 that the number of pieces of learning data is insufficient (step S131: NO), the first communication unit 110 transmits (outputs) the model generated by the model generation unit 181 to the suspicion detection device 300 (step S151). Even when it is determined in step S131 that a category formed by combining subcategories is not present, the category adjustment unit 182 proceeds to step S151.

In steps S161 to S214, the image acquisition device 200 captures images, and the suspicion detection device 300 performs a suspicion detection process on the images.

First, the second communication unit 310 of the suspicion detection device 300 receives the model data transmitted by the first communication unit 110 in step S151 (step S161).

Moreover, the image acquisition unit 210 of the image acquisition device 200 captures the images of the inside of the monitoring target store (step S201). The image output unit 220 transmits (outputs) the images obtained in step S201 to the suspicion detection device 300 as image data (step S202).

In the suspicion detection device 300, the second communication unit 310 receives the image data transmitted by the image output unit 220 in step S202 (step S211).

Subsequently, the image extraction unit 383 determines the presence (that is, the presence of suspicion) of an abnormality occurrence possibility with respect to the images obtained in step S211 (step S212). As described above, the image extraction unit 383 calculates a score of the images obtained in step S211 for respective categories. The image extraction unit 383 determines that the abnormality occurrence possibility is present when the score is equal to or larger than a threshold for any one or more categories.

When the image extraction unit 383 determines in step S212 that the abnormality occurrence possibility is not present (step S212: NO), the notification system 1 ends the process on the image captured by the image acquisition unit 210. In this case, the process resumes from step S201 at the subsequent capturing timing of the image acquisition device 200.

When the image extraction unit 383 determines in step S212 that an abnormality occurrence possibility is present (step S212: YES), the image extraction unit 383 extracts a plurality of images captured in a predetermined period of time including the capturing time point of the image (a suspicious image) for which it is determined that the abnormality occurrence possibility is present (step S213). Specifically, the image extraction unit 383 reads a plurality of images captured in a predetermined period of time including the capturing time point of the suspicious image from the image data storage unit 371 via the image management unit 381.

Subsequently, the second communication unit 310 transmits information indicating the suspicious image for which it is determined that the abnormality occurrence possibility is present and the category candidates to the learning device 100 (step S214). Specifically, the second communication unit 310 transmits the plurality of images obtained in step S213 and information indicating the category for which it is determined in step S212 that the score is equal to or larger than the threshold. When it is determined in step S212 that the scores of a plurality of categories are equal to or larger than the threshold, the second communication unit 310 may transmit information indicating all categories for which it is determined that the score is equal to or larger than the threshold. Alternatively, the second communication unit 310 may transmit information indicating representative one or more categories (for example, transmits information indicating the category having the highest score).

Furthermore, the specifying unit 382 specifies a target included in the suspicious image, and the second communication unit 310 transmits information indicating the specification result of the specifying unit 382 in step S214. For example, the specifying unit 382 detects a person included in the suspicious image and specifies the detected person. The second communication unit 310 transmits the identification information for specifying the person specified by the specifying unit 382 to the learning device 100.

Alternatively, the learning device 100 may include a functional unit corresponding to the specifying unit 382 and may specify a target.

In steps S221 to S223, the learning device 100 determines a transmission destination of a plurality of images including the suspicious image and the category candidates and transmits information indicating the suspicious image and the category candidates to the determined transmission destination.

Specifically, the first communication unit 110 receives the information transmitted by the second communication unit 310 in step S214 (step S221).

The transmission destination determination unit 183 determines a person other than the person specified by the specifying unit 382 as the transmission destination of the suspicious image and the category candidates on the basis of the specified person (step S222). The transmission destination of the suspicious image and the category candidates is the abnormality determination device 400 carried by a person other than the person specified by the specifying unit 382, for example.

The first communication unit 110 transmits the plurality of images including the suspicious image and the category candidates received in step S221 to the transmission destination determined by the transmission destination determination unit 183 in step S222 (step S223).

In steps S231 to S302, the abnormality determination device 400 determines the presence of an abnormality in the suspicious image.

Specifically, the third communication unit 410 receives information indicating the plurality of images including the suspicious image and the category candidates transmitted by the first communication unit 110 in step S223 (step S231).

The abnormality determination unit 481 acquires a presence-of-abnormality determination result and a category determination result (step S301). Specifically, as described above, the display unit 420 displays a plurality of images including the suspicious image. The presence-of-action determination result acquisition unit 482 acquires a determination result on the presence of an abnormality on the basis of a user operation. Moreover, the category determination result acquisition unit 483 acquires a category determination result on the basis of a user operation.

The third communication unit 410 transmits the determination result obtained in step S301 to the learning device 100 (step S302). Specifically, the third communication unit 410 transmits the suspicious image or the identification information indicating the image and the determination result of the category corresponding to the suspicious image to the learning device 100.

Furthermore, the third communication unit 410 transmits information indicating a portion in which an abnormality is photographed within the suspicious image to the learning device 100 in step S302.

In steps S311 to S332, the learning device 100 acquires the suspicious image to generate learning data.

Specifically, the first communication unit 110 receives the data transmitted by the third communication unit 410 in step S302 (step S311).

The first communication unit 110 transmits a suspicious image request including the identification information of the suspicious image obtained in step S311 and the information indicating the portion in which an abnormality is photographed within the suspicious image to the suspicion detection device 300 according to the control of the first control unit 180 (step S312).

In the suspicion detection device 300, the second communication unit 310 receives the suspicious image request from the learning device 100, and the image management unit 381 searches the image data storage unit 371 on the basis of the identification information included in the suspicious image request to acquire the suspicious image (step S321).

The partial image clipping unit 384 clips the portion in which an abnormality is photographed from the suspicious image (step S322). Specifically, the partial image clipping unit 384 clips a partial image of the portion indicated by the information indicating the portion in which an abnormality is photographed from the suspicious image obtained in step S321 on the basis of the information indicating the portion in which the abnormality is photographed.

The second communication unit 310 transmits the partial image clipped by the partial image clipping unit 384 to the learning device 100 (step S323). Moreover, when the notification system 1 includes a plurality of image acquisition devices 200, the second communication unit 310 transmits a camera ID (Identifier) for identifying the image acquisition device 200 that has captured the suspicious image to the learning device 100.

In the learning device 100, the first communication unit 110 receives data transmitted by the second communication unit 310 in step S322 (step S331).

The model generation unit 181 correlates (associates) the partial image obtained in step S331 and the category indicated by the category determination result obtained in step S311 with each other to generate learning data (step S332).

In the model generation process, after step S332, the model generation unit 181 returns the process to step S102.

In steps S341 to S362, the abnormality determination device 400 sends a report request to the learning device 100 and the learning device 100 performs reporting on the basis of the request.

Specifically, the third control unit 480 of the abnormality determination device 400 branches the process on the basis of the determination result in step S301 (step S341).

When the determination result in step S301 indicates that an abnormality is not present (step S341: NO), the third control unit 480 ends the processes of FIGS. 7 to 9 with respect to the reporting process.

On the other hand, when the determination result in step S301 indicates that an abnormality is present (step S341: YES), the third communication unit 410 transmits a report request to the learning device 100 according to the control of the third control unit 480 (step S351).

After step S351, the third control unit 40 of the abnormality determination device 400 ends the processes of FIGS. 7 to 9 with respect to the reporting process.

On the other hand, in the learning device 100, the first communication unit 110 receives a report request from the abnormality determination device 400 (step S361).

The reporting unit 184 sends a report to a predetermined report destination on the basis of the report request obtained in step S361 (step S362).

After step S362, the learning device 100 ends the processes of FIGS. 7 to 9 with respect to the reporting process.

Next, a hardware configuration example of respective devices included in the notification system 1 will be described with reference to FIGS. 10 to 13.

Figure 10:
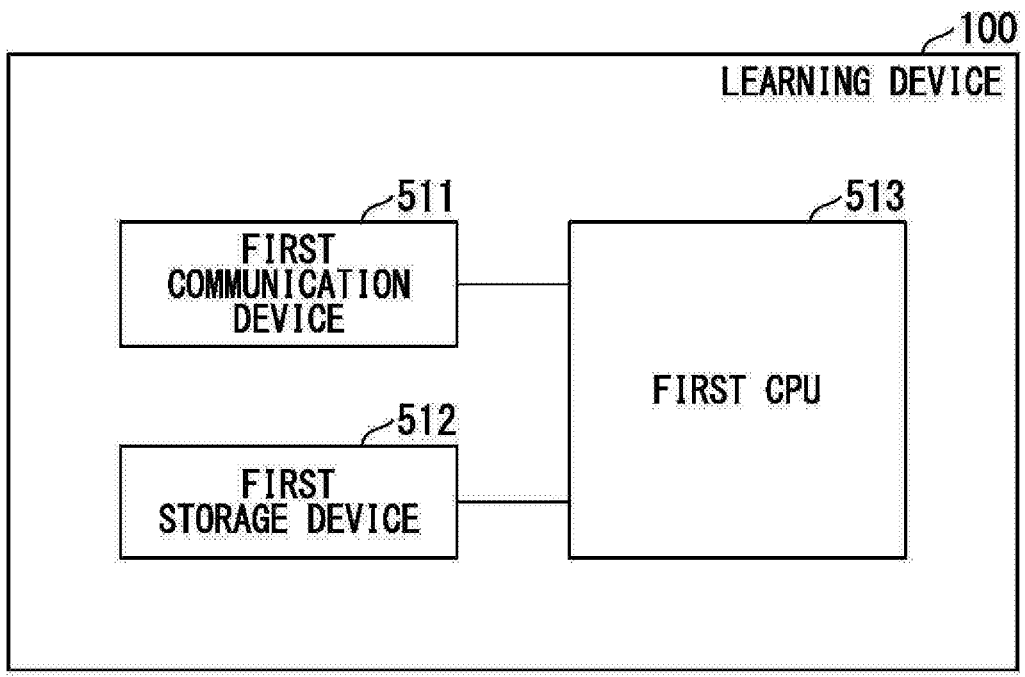
FIG. 10 is a block diagram showing an example of a hardware configuration of the learning device according to the embodiment.

FIG. 10 is a block diagram showing an example of a hardware configuration of the learning device 100. As shown in the drawings, the learning device 100 includes a first communication device 511, a first storage device 512, and a first CPU 513.

The first communication device 511 is a device that communicates with other devices, and realizes the first communication unit 110. The first storage device 512 is a device that stores various types of data, and realizes the first storage unit 170. The first CPU 513 is a device that executes a program. The first CPU 513 realizes the first control unit 180 by reading a program from the first storage device 512 and executing the program.

Figure 11:
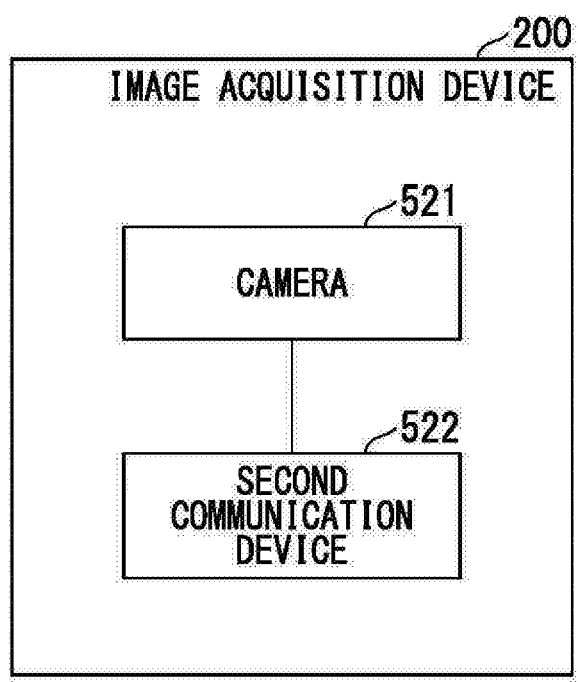
FIG. 11 is a block diagram showing an example of a hardware configuration of the image acquisition device according to the embodiment.

FIG. 11 is a block diagram showing an example of a hardware configuration of the image acquisition device 200. As shown in the drawing, the image acquisition device 200 includes a camera 521 and a second communication device 522.

The camera 521 is a device that performs capturing and outputs image data, and realizes the image acquisition unit 210. The second communication device 522 is a device that communicates with other devices, and realizes the image output unit 220.

Figure 12:
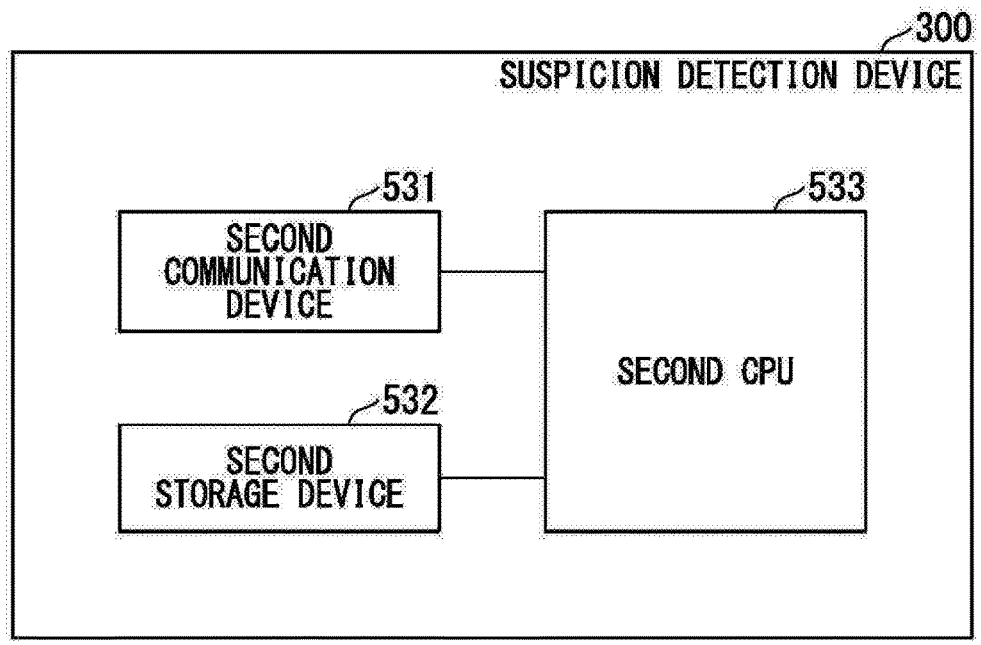
FIG. 12 is a block diagram showing an example of a hardware configuration of the suspicion detection device according to the embodiment.

FIG. 12 is a block diagram showing an example of a hardware configuration of the suspicion detection device 300. As shown in the drawing, the suspicion detection device 300 includes a third communication device 531, a second storage device 532, and a second CPU 533.

The third communication device 531 is a device that communicates with other devices, and realizes the second communication unit 310. The second storage device 532 is a device that stores various types of data, and realizes the second storage unit 370. The second CPU 533 is a device that executes a program. The second CPU 533 realizes the second control unit 380 by reading a program from the second storage device 532 and executing the program.

Figure 13:
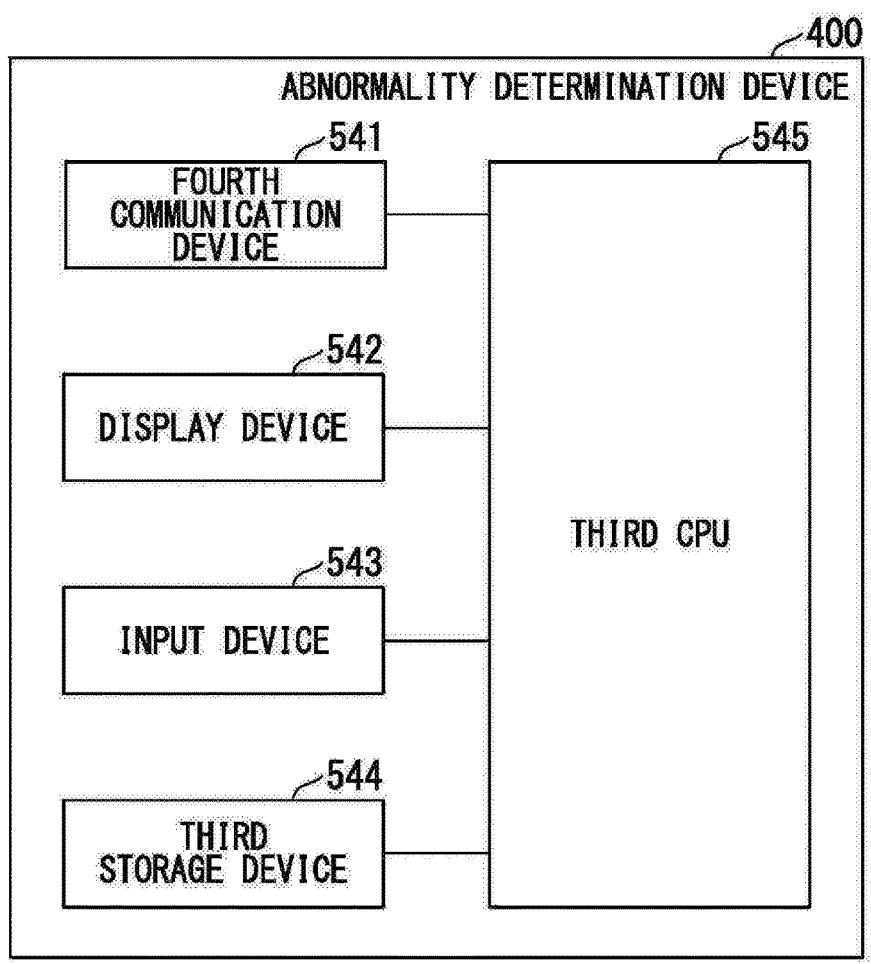
FIG. 13 is a block diagram showing an example of a hardware configuration of the abnormality determination device according to the embodiment.

FIG. 13 is a block diagram showing an example of a hardware configuration of the abnormality determination device 400. As shown in the drawing, the abnormality determination device 400 includes a fourth communication device 541, a display device 542, an input device 543, a third storage device 544, and a third CPU 545.

The fourth communication device 541 is a device that communicates with other devices, and realizes the third communication unit 410. The display device 542 is a device that has a display screen and displays various images, and realizes the display unit 420. The input device 543 is a device that detects a user operation, such as, for example, a touch sensor provided on a display screen of the display device 542 to form a touch panel, and realizes the operation input unit 430. The third storage device 544 is a device that stores various types of data, and forms the third storage unit 470. The third CPU 545 is a device that executes a program. The third CPU 545 realizes the third control unit 480 by reading a program from the third storage device 544 and executing the program.

As described above, the information acquisition unit acquires information on a target included in an image. The transmission unit 190 determines a transmission destination of the image or information on the image according to the information on the target and transmits the image or the information on the image.

In this way, the notification system 1 (for example, the learning device 100) can determine the transmission destination appropriate for the image and transmit the image or the information on the image to the determined transmission destination.

The specifying unit 382 specifies a target from a suspicious image. The transmission unit 190 determines a transmission destination different from a transmission destination correlated with the target specified by the specifying unit as the transmission destination of the suspicious image or the information on the suspicious image.

In this way, when a person directly involved in fraudulent action or a friend thereof is photographed in an image, the notification system 1 (for example, the learning device 100) can select a person other than the person or the friend thereof and transmit information to the selected person. The transmitted information is information for notifying of the abnormality occurrence possibility, for example. In this way, it is possible to suppress occurrence of abnormal situation.

The image extraction unit 383 extracts a suspicious image. The image extraction unit 383 extracts a plurality of images captured in a predetermined period of time including the capturing time point of the suspicious image.

The transmission unit 190 transmits the plurality of images extracted by the image extraction unit 383 or the information on the plurality of images as the suspicious image or the information on the suspicious image.

In this manner, when the image extraction unit 383 extracts a plurality of images, the user who refers to the images can easily understand the motion of the person included in the images.

The image extraction unit 383 extracts the suspicious image using the model data generated by machine learning. The transmission unit 190 transmits information on the model data used for extracting the suspicious image. Specifically, the transmission unit 190 transmits information indicating the candidates for the category corresponding to the suspicious image.

In this way, the user can determine the category corresponding to the suspicious image by referring to the candidates for the category. The learning device 100 can generate learning data using the category determination result and perform learning.

The partial image clipping unit 384 clips a partial image in which the action of the target used for generating the model data appears within the suspicious image.

The model generation unit 181 can understand the feature of the image indicating an abnormality more accurately by performing learning using the partial image and perform learning with higher accuracy.

The information acquisition unit acquires the category corresponding to the action of the target included in the suspicious image among a plurality of categories set as the categories of the action of the target as the information on the target included in the suspicious image and correlates the suspicious image with the corresponding category.

In this way, the user can determine the presence of an abnormality by referring to the suspicious image and the category, and in this respect, the user can determine the presence of an abnormality more easily.

The model generation unit 181 generates model data to be used for extracting the suspicious image by machine learning.

When a first category for which the number of pieces of learning data corresponding to the category is smaller than a predetermined number is detected among the plurality of categories, the category adjustment unit 182 calculates a similarity between the first category and other categories and puts the first category and one or more second categories having a high similarity together as one category.

In this way, it is possible to secure the number of pieces of learning data included in each category. By securing the number of pieces of learning data, it is possible to increase the accuracy of learning performed by the model generation unit 181.

The category adjustment unit 182 measures the number of pieces of learning data corresponding to each of a plurality of subcategories being put together as one category. When it is determined for all subcategories that the number of pieces of learning data is equal to or larger than a predetermined number, the category adjustment unit 182 subdivides the category being put together into a plurality of subcategories to generate categories from the respective subcategories.

In this way, it is possible to subdivide the category and to increase the accuracy of the learning performed by the model generation unit 181.

The display unit 420 acquires an image and information on the image from the information processing device and displays the image or the information on the image, wherein the information processing device determines a transmission destination of the image or the information on the image according to the information on the target included in the image and transmits the image or the information on the image to the display unit 420. The abnormality determination unit 481 determines the image or the information on the image. The third communication unit 410 outputs the determination result as learning data for machine learning.

In this way, a device (the learning device 100) that performs machine learning can improve the learning accuracy using the learning data.

The presence-of-action determination result acquisition unit 482 acquires a determination result as to whether the image or the information on the image displayed by the display unit 420 is the image or the information when an action serving as a target of the machine learning was performed. Here, the information on the image mentioned herein may be any one of or a combination of a time point at which the image was captured, the position information of the image acquisition device 200 that has captured the image, and the target photographed in the image, for example. The target photographed in the image is a person, an object, or an organization, for example.

When it is determined that the image or the information on the image displayed by the display unit 420 is the image or the information when the action serving as the target of the machine learning was performed, the category determination result acquisition unit 483 acquires a determination result on the category corresponding to the action.

In this way, the device (the learning device 100) that performs machine learning can acquire learning data in which the image in which an action serving as the target of the machine learning is photographed is correlated with the category to perform learning and improve the learning accuracy.

In the notification system 1, by the machine learning performed by the learning device 100, the suspicion detection device 300 detects a suspicious person, a suspicious action, or the like as described above. The learning device 100 sends the image in which the suspicion detection device 300 has detected a suspicious person, a suspicious action, or the like to the abnormality determination device 400 possessed by a manager or the like of the store together with the images obtained in a predetermined period before and after the image was captured.

The learning device 100 determines a person who is not photographed in an image in which a suspicious action was detected as a notification destination among predetermined notification destinations. In this way, when a person such as a store manager having an administrator right is involved in the fraudulent action, concealing of the notification and ignoring without taking any measures for the notification can be prevented.

In the abnormality determination device 400, a determiner such as a store manager makes determination by performing an operation of selecting categories defined in advance or creating a new category by referring to a notification screen.

The determiner may determine the presence of an abnormality and the type of abnormality by referring to the image and the like displayed on the notification screen and can perform operations without being aware of the learning by the learning device 100. A determination target abnormality is a fraudulent action and an accident such as a fall, for example.

The learning device 100 may send the notification to a plurality of persons so that the determination accuracy is increased by the majority rule based on the determination results of the plurality of persons.

The abnormality determination device 400 registers the category determined by the determiner and the image that the abnormality determination device 400 is notified of by the learning device 100 in the learning device 100 as additional learning data in correlation with each other. In this way, the abnormality determination device 400 clips only the portion which can be determined to be a suspicious action within the image by the determiner designating a portion of the image, a background difference between images, or detecting the determiner's gaze and transmits the clipped portion as additional learning data. In this way, it is possible to reduce a data transmission amount, shorten the learning time, and improve the accuracy of the learning model.

On the other hand, the learning device 100 transmits all images to the abnormality determination device 400 rather than only part of the suspicious image detected by the suspicion detection device 300. In this way, when an abnormality different from the possibility (suspicion) of the abnormality detected by the suspicion detection device 300 is unexpectedly photographed in the image, the determiner can find the abnormality and determine that an abnormality is present. For example, when a shoplifter is unexpectedly photographed in an image for which the suspicion detection device 300 has determined that the possibility of a fraudulent operation on a cash register is present, the determiner performs a user operation of indicating a portion in which a shoplifter is photographed using shoplifting as a category.

In this way, the learning device 100 can acquire learning data indicating an abnormality different from the possibility of the abnormality detected by the suspicion detection device 300 and can learn the abnormality.

Here, in machine learning, sufficient recognition accuracy is not obtained unless the number of pieces of teaching data is sufficient. Due to this, as described above, the category adjustment unit 182 of the learning device 100 checks a similarity between categories, combines categories in which a certain similarity or higher is obtained to compensate for the insufficient number of pieces of teaching data to secure recognition accuracy.

When a sufficient number of pieces of teaching data are obtained for one category by the operation of the notification system 1, the category adjustment unit 182 categorizes such categories as similar but different categories. In this way, it is possible to detect images and categorize categories in a more detailed manner.

In this manner, since the notification system 1 can perform additional learning without requiring the user to understand a complex system, it is possible to improve the detection accuracy and prevent damages.

A service provider only needs to cause the learning device 100 to perform minimally necessary learning in an initial stage and does not need to perform a learning maintenance operation further. In this respect, it is possible to reduce the operation cost of the service provider.

Moreover, since a maintenance operator of the service provider is not involved, the risk of leakage of privacy to the operator is reduced.

Here, a method of continuously monitoring the fraud using a monitoring camera system and a method of continuously capturing images using a monitoring camera and checking and analyzing recorded data may be used as a fraud monitoring method. However, according to these methods, a human resource cost required for continuous monitoring or checking or analysis of image data may increase too high. In contrast, in the notification system 1, the determiner such as a store manager may determine the presence of an abnormality when the suspicion detection device 30 has detected a suspicious image. In this respect, it is possible to lessen the burden of the determiner.

Examples of a fraudulent operation in a POS system (a cash register) include an operation of superimposing two goods so that the barcode of one goods is read by the POS system, an operation of not passing goods through the POS system while covering the barcode with something, and an operation of covering a barcode with hands. Moreover, a new trick of the fraudulent operation may be performed.

The learning device 100 can learn a new trick of the fraudulent operation in addition to known tricks of the fraudulent operation using the learning data obtained from the abnormality determination device 400. In this way, the notification system 1 can detect the new trick of the fraudulent operation.

The threshold by which the suspicion detection device 300 determines that a suspicion is present may be to a low value. For example, the suspicion detection device 300 may detect an image as a suspicious image when a score indicating that a similarity with any one of categories is 60% or more is calculated for the image.

In this way, it is possible to increase the possibility that the suspicion detection device 300 detects an image in which a new trick of the fraudulent operation is photographed as a suspicious image.

Next, a minimal configuration of the present invention will be described with reference to FIGS. 14 to 16.

Figure 14:
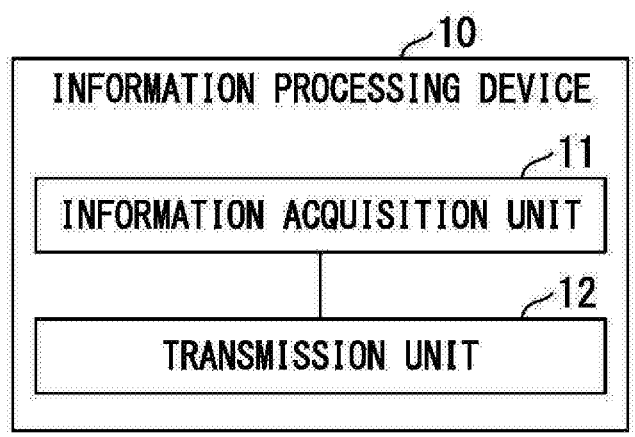
FIG. 14 is a block diagram showing a minimal configuration of an information processing device according to the present invention.

FIG. 14 is a block diagram showing a minimal configuration of an information processing device according to the present invention. The information processing device 10 shown in the drawing includes an information acquisition unit 11 and a transmission unit 12.

The information acquisition unit 11 acquires information on a target included in an image. The transmission unit 12 determines a transmission destination of the image or the information on the image according to the information on the target and transmits the image or the information.

In this way, the information processing device 10 can determine a transmission destination appropriate for the image and transmit the image or the information on the image to the determined transmission destination.

Figure 15:
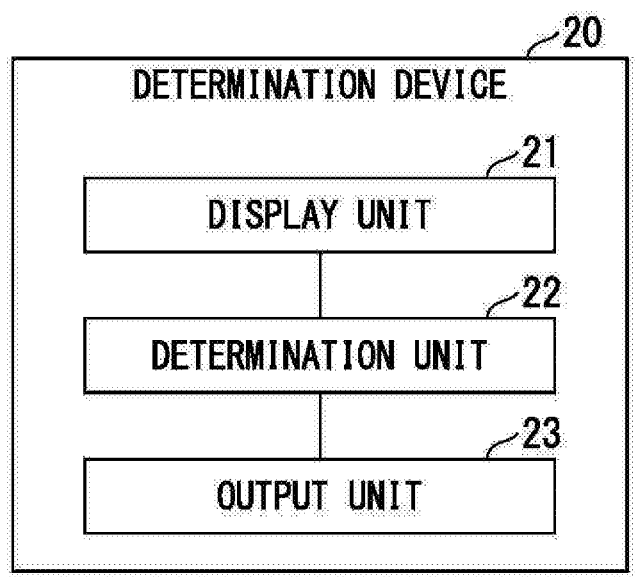
FIG. 15 is a block diagram showing a minimal configuration of a determination device according to the present invention.

FIG. 15 is a block diagram showing a minimal configuration of a determination device according to the present invention. A determination device 20 shown in the drawing includes a display unit 21, a determination unit 22, and an output unit 23.

The display unit 21 acquires an image or information on the image from an information processing device that is configured to determine a transmission destination of the image or the information on the image according to information on a target included in the image and transmits the image or the information on the image and displays the image or the information on the image. The determination unit 22 determines whether the image or the information on the image will be used for machine learning. The output unit 23 outputs a determination result as learning data of the machine learning.

In this way, a device that performs machine learning can increase learning accuracy using the learning data.

Figure 16:
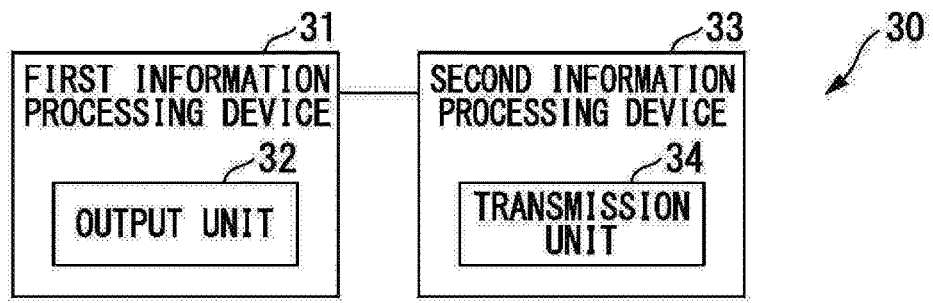
FIG. 16 is a block diagram showing a minimal configuration of a notification system according to the present invention.

FIG. 16 is a block diagram showing a minimal configuration of a notification system according to the present invention. A notification system 30 shown in the drawing includes a first information processing device 31 and a second information processing device 33. The first information processing device 31 includes an output unit 32. The second information processing device 33 includes a transmission unit 34.

The output unit 32 of the first information processing device 31 outputs information on the target included in the image. The transmission unit 34 of the second information processing device 33 determines a transmission destination of the image or the information on the image according to the information on the target and transmits the image or the information on the image.

In this way, the second information processing device 33 (the transmission unit 34) can determine the transmission destination appropriate for the image and transmit the image or the information on the image to the determined transmission destination.

Next, an operation of the minimal configuration of the present invention will be described with reference to FIGS. 17 to 19.

Figure 17:
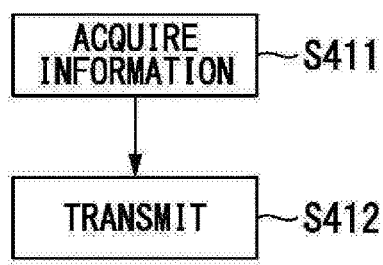
FIG. 17 is a flowchart showing a processing example performed by the information processing device according to the embodiment.

FIG. 17 is a flowchart showing an example of a process performed by the information processing device 10 (FIG. 14). In the process shown in the drawing, the information acquisition unit 11 executes an information acquisition step of acquiring information on a target included in an image (step S411). The transmission unit 12 executes a transmission step of determining a transmission destination of the image or the information on the image according to the information on the target and transmitting the image or the information on the image (step S412).

Figure 18:
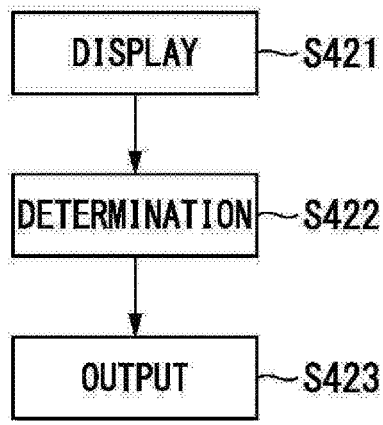
FIG. 18 is a flowchart showing a processing example performed by the determination device according to the embodiment.

FIG. 18 is a flowchart showing a processing example performed by the determination device 20 (FIG. 15). In the process shown in the drawing, the display unit 21 executes a display step of acquiring an image or information on the image from an information processing device and displaying the image or the information on the image, wherein the information processing device determines a transmission destination of the image or the information on the image according to information on a target included in the image and transmits the image or the information on the image (step S421). The determination unit 22 executes a determination step of determining the image or the information on the image (step S422). The output unit 23 executes an output step of outputting a determination result as learning data of machine learning (step S423).

Figure 19:
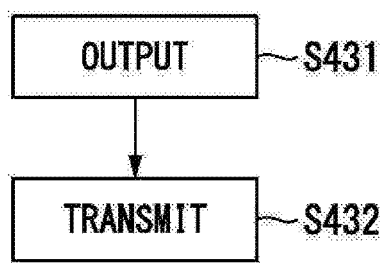
FIG. 19 is a flowchart showing a processing example performed by the notification system according to the embodiment.

FIG. 19 is a flowchart showing a processing example performed by the notification system 30 (FIG. 16). In the process shown in the drawing, the output unit 32 of the first information processing device 31 executes an output step of outputting information on the target included in the image (step S431). The transmission unit 34 of the second information processing device 33 executes a transmission step of determining a transmission destination of the image or the information on the image according to the information on the target and transmitting the image or the information on the image (step S432).

The functions of all or some of the information processing device 10, the determination device 20, the first information processing device 31, the second information processing device 33, the learning device 100, the suspicion detection device 300, the suspicion detection device 301, and the abnormality determination device 400 of the above-described embodiment may be realized by a CPU reading a program and executing the program. In this case, the functions may be realized by recording the program for realizing the function on a computer-readable recording medium and causing a computer system to read and execute the program recorded on the recording medium. The "computer system" used herein may include an OS and hardware such as peripheral devices. Moreover, the "computer-readable recording medium" refers to a storage device such as a portable medium such as a flexible disk, a magneto-optical disc, a ROM, or CD-ROM, and a hard disk included in the computer system. Furthermore, the "computer-readable recording medium" may include a medium for temporarily and dynamically storing programs, like a communication line when a program is transmitted via a network such as the Internet or a communication line such as a telephone line, and a medium for storing programs for a predetermined period, like a volatile memory inside a computer system that serves as a server or a client in that case. The program may be a program for realizing some of the above-described functions. Alternatively, the program may be a program capable of realizing the above-described functions in combination with a program previously stored in a computer system. Alternatively, the program may be realized using a programmable logic device such as a field programmable gate array (FPGA).

Although the embodiment of the present invention has been described above in detail with reference to the drawings, specific configurations are not limited thereto and design changes and the like can also be made without departing from the scope of the present invention.

Priority is claimed on Japanese Patent Application No. 2015-195218, filed Sep. 30, 2015, the content of which is incorporated herein by reference.

INDUSTRIAL APPLICABILITY

The present invention can be applied to uses where it is essential to determine a transmission destination appropriate for an image.

REFERENCE SIGNS LIST 1, 30 Notification system
10 Information processing device
11 Information acquisition unit
12, 34, 190 Transmission unit
20 Determination device
21, 420 Display unit
22 Determination unit
23, 32 Output unit
31 First information processing device
33 Second information processing device
100 Learning device
110 First communication unit
170 First storage unit
180 First control unit
181 Model generation unit
182 Category adjustment unit
183 Transmission destination determination unit
184 Reporting unit
200 Image acquisition device
210 Image acquisition unit
220 Image output unit
300, 301 Suspicion detection device
310 Second communication unit
370 Second storage unit
371 Image data storage unit
380, 390 Second control unit
381 Image management unit
382 Specifying unit
383 Image extraction unit
384 Partial image clipping unit
385 Transmission destination determination unit
400 Abnormality determination device
410 Third communication unit
430 Operation input unit
470 Third storage unit
480 Third control unit
481 Abnormality determination unit
482 Presence-of-action determination result acquisition unit
483 Category determination result acquisition unit
511 First communication device
512 First storage device
513 First CPU
521 Camera
522 Second communication device
531 Third communication device
532 Second storage device
533 Second CPU
541 Fourth communication device
542 Display device
543 Input device
544 Third storage device
545 Third CPU
900 Network

What is claimed is:

1. An information processing device comprising:
at least one processor configured to implement:
an image extraction unit configured to acquire an image, calculate scores for respective criminal actions with respect to the image using model data generated by machine learning, determine that a criminal action appears in the image when any one of the calculated scores is equal to or larger than a predetermined threshold, and determine that no criminal action appears in the image when all of the calculated scores are lower than the predetermined threshold;
a specifying unit configured to specify a person that appears in the image;
a transmission unit configured to transmit the image or information indicating a criminal action corresponding to one of the calculated scores that is equal to or larger than the predetermined threshold to a transmission destination other than a destination corresponding to the person specified by the specifying unit among predetermined transmission destinations,
an information acquisition unit configured to acquire a category corresponding to an action of the person included in the image among a plurality of categories set as a category of the action of the person as information on the person included in the image and correlate the image and the corresponding category with each other;
a model generation unit configured to generate the model data used for extracting the image by machine learning; and
a category adjustment unit configured to calculate a similarity between a first category and other categories when the first category in which a number of pieces of learning data corresponding to the category among the plurality of categories is smaller than a predetermined number is detected and put the first category and one or more second categories having a higher similarity than a threshold together as one category,
wherein the category adjustment unit is further configured to measure a number of pieces of learning data corresponding to each of a plurality of subcategories being put together as a category, and subdivide the category put together into the plurality of subcategories to generate categories from the respective subcategories when it is determined that a number of pieces of learning data is equal to or larger than a predetermined number for all of the subcategories.

2. The information processing device according to claim 1, wherein the transmission unit is further configured to determine the transmission destination different from a transmission destination correlated with the person specified by the specifying unit.

3. The information processing device according to claim 1, wherein the image extraction unit is further configured to extract a plurality of images captured in a predetermined period of time including a capturing time point of the image in which the person is included, and
wherein the transmission unit is further configured to transmit the plurality of images extracted by the image extraction unit or information on the plurality of images as the image or the information indicating the criminal action.

4. The information processing device according to claim 3, wherein the image extraction unit is further configured to extract the image in which the person is included using the model data, and
wherein the transmission unit is further configured to transmit information on the model data used for extracting the image to the transmission destination of the image or the information indicating the criminal action.

5. The information processing device according to claim 4, wherein the at least one processor is further configured to implement a partial image clipping unit configured to clip a partial image in which an action of the person used for generating the model data appears within the image, and
wherein the model data is generated on the basis of the partial image clipped by the partial image clipping unit.

6. A notification system comprising:
a first information processing device comprising at least one processor configured to implement:
an image extraction unit configured to acquire an image, calculate scores for respective criminal actions with respect to the image using model data generated by machine learning, determine that a criminal action appears in the image when any one of the calculated scores is equal to or larger than a predetermined threshold, and determine that no criminal action appears in the image when all of the calculated scores are lower than the predetermined threshold;
a specifying unit configured to specify a person that appears in the image; and
an information acquisition unit configured to acquire a category corresponding to an action of the person included in the image among a plurality of categories set as a category of the action of the person as information on the person included in the image and correlate the image and the corresponding category with each other; and
a second information processing device comprising at least one processor configured to implement:
a transmission unit configured to transmit the image or information indicating a criminal action corresponding to one of the calculated scores that is equal to or larger than the predetermined threshold to a transmission destination other than a destination corresponding to the person specified by the specifying unit among predetermined transmission destinations,
a model generation unit configured to generate the model data used for extracting the image by machine learning; and
a category adjustment unit configured to calculate a similarity between a first category and other categories when the first category in which a number of pieces of learning data corresponding to the category among the plurality of categories is smaller than a predetermined number is detected and put the first category and one or more second categories having a higher similarity than a threshold together as one category,
wherein the category adjustment unit is further configured to measure a number of pieces of learning data corresponding to each of a plurality of subcategories being put together as a category, and subdivide the category put together into the plurality of subcategories to generate categories from the respective subcategories when it is determined that a number of pieces of learning data is equal to or larger than a predetermined number for all of the subcategories.

7. An information transmission method comprising:
generating model data used for extracting the image by machine learning;
acquiring an image;
calculating scores for respective criminal actions with respect to the image using the model data generated by machine learning;
determining that a criminal action appears in the image when any one of the calculated scores is equal or larger than a predetermined threshold;
determining that no criminal action appears in the image when all of the calculated scores are lower than the predetermined threshold;
specifying a person that appears in the image;
transmitting the image or information indicating a criminal action corresponding to one of the calculated scores that is equal or larger than the predetermined threshold to a transmission destination other than a destination corresponding to the person specified by the specifying step among predetermined transmission destinations;
acquiring a category corresponding to an action of the person included in the image among a plurality of categories set as a category of the action of the person as information on the person included in the image and correlating the image and the corresponding category with each other;
calculating a similarity between a first category and other categories when the first category in which a number of pieces of learning data corresponding to the category among the plurality of categories is smaller than a predetermined number is detected and putting the first category and one or more second categories having a higher similarity than a threshold together as one category; and
measuring a number of pieces of learning data corresponding to each of a plurality of subcategories being put together as a category, and subdividing the category put together into the plurality of subcategories and generating categories from the respective subcategories based on a number of pieces of learning data being equal to or larger than a predetermined number for all of the subcategories.

* * * * *